US011120360B2

(12) United States Patent
Kim et al.

(10) Patent No.: US 11,120,360 B2
(45) Date of Patent: Sep. 14, 2021

(54) OPTICAL HOLOGRAPHIC ADDRESSING OF ATOMIC QUANTUM BITS

(71) Applicant: Massachusetts Institute of Technology, Cambridge, MA (US)

(72) Inventors: Donggyu Kim, Arlington, MA (US); Dirk Robert Englund, Brookline, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 17/061,759

(22) Filed: Oct. 2, 2020

(65) Prior Publication Data
US 2021/0166147 A1 Jun. 3, 2021

Related U.S. Application Data

(60) Provisional application No. 62/942,273, filed on Dec. 2, 2019.

(51) Int. Cl.
*G02B 5/32* (2006.01)
*G06N 10/00* (2019.01)
(Continued)

(52) U.S. Cl.
CPC ............. *G06N 10/00* (2019.01); *G02F 3/00* (2013.01); *G03H 1/2645* (2013.01); *G03H 2001/2675* (2013.01)

(58) Field of Classification Search
CPC . G02B 5/32; G06N 10/00; G02F 3/00; G03H 1/2645; G03H 2001/2675; G03H 1/0005;
(Continued)

(56) References Cited

U.S. PATENT DOCUMENTS 10,891,555 B2 * 1/2021 Ashrafi ................... H04L 9/085
2012/0076503 A1 3/2012 Habif
(Continued)

FOREIGN PATENT DOCUMENTS

WO 2019014589 A1 1/2019

OTHER PUBLICATIONS

Barredo et al., "An atom-by-atom assembler of defect-free arbitrary two-dimensional atomic arrays." Science 354.6315 (2016): 1021-1023.
(Continued)

*Primary Examiner* — Arnel C Lavarias
(74) *Attorney, Agent, or Firm* — Smith Baluch LLP

(57) ABSTRACT

Atoms and atom-like quantum emitters are promising for quantum sensing, computing, and communications. Lasers and microscopes enable high-fidelity quantum control of the atomic quantum bits (qubits). However, it is challenging to scale up individual quantum control to enough atomic quantum nodes for implementing useful and practical quantum algorithms. Here, we introduce methods and systems to holographically implement large-scale quantum circuits that individually address atomic quantum nodes. These methods enable implementation of quantum circuits over large, multi-dimensional arrays of atomic qubits at rates of thousands to millions of quantum circuit layers per second. The quantum circuit layers are encoded in multiplexed holograms displayed on a slow SLM and retrieved by fast interrogation to produce spatial distributions that operate on the qubit array. This technology can also be used for optically addressing objects such as biological cells and on-chip photonic components for optical tweezers, optogenetics, optical computing, and optical neural networks.

21 Claims, 15 Drawing Sheets

(51) Int. Cl.
*G03H 1/26* (2006.01)
*G02F 3/00* (2006.01)
(58) Field of Classification Search
CPC .............. G03H 2001/0077; G03H 1/22; G03H 1/2294; G03H 1/26
USPC .......... 359/15, 1, 17, 22, 25, 29, 32, 33, 35, 359/107, 108
See application file for complete search history.

(56) References Cited

U.S. PATENT DOCUMENTS

| | | | |
|---|---|---|---|
| 2014/0192388 A1* | 7/2014 | Miller | G06N 10/00 359/3 |
| 2015/0001422 A1 | 1/2015 | Englund et al. | |
| 2019/0235031 A1 | 8/2019 | Ibrahim et al. | |

OTHER PUBLICATIONS

Bernien et al., "Probing many-body dynamics on a 51-atom quantum simulator." Nature 551.7682 (2017): 579-584.
Bravyi et al., "Quantum advantage with shallow circuits." Science 362.6412 (2018): 308-311.
Endres et al., "Atom-by-atom assembly of defect-free one-dimensional cold atom arrays." Science 354.6315 (2016): 1024-1027.
Iga, "Surface-emitting laser—its birth and generation of new optoelectronics field." IEEE Journal of Selected Topics in Quantum Electronics 6.6 (2000): 1201-1215.
International Search Report and Written Opinion in International Patent Application No. PCT/US2020/053905 dated Dec. 22, 2020, 12 pages.
Kim et al., "Implementing transmission eigenchannels of disordered media by a binary-control digital micromirror device." Optics Communications 330 (2014): 35-39.
Kim et al., "In situ single-atom array synthesis using dynamic holographic optical tweezers." Nature Communications 7.1 (2016): 1-8.
Kim et al., "Large-scale uniform optical focus array generation with a phase spatial light modulator." Optics Letters 44.12 (2019): 3178-3181.
Knoernschild et al., "Independent individual addressing of multiple neutral atom qubits with a micromirror-based beam steering system." Applied Physics Letters 97.13 (2010): 134101. 4 pages.
Lee, "III computer-generated holograms: Techniques and applications." Progress in Optics. vol. 16. Elsevier, 1978. 119-232.
Levine et al., "High-fidelity control and entanglement of rydberg-atom qubits." Physical Review Letters 121.12 (2018): 123603. 6 pages.
Lienhard et al., "Observing the space-and time-dependent growth of correlations in dynamically tuned synthetic ising models with antiferromagnetic interactions." Physical Review X 8.2 (2018): 021070. 17 pages.
Lu et al., "Aluminum nitride integrated photonics platform for the ultraviolet to visible spectrum." Optics Express 26.9 (2018): 11147-11160.
Maurer et al., "Room-temperature quantum bit memory exceeding one second." Science 336.6086 (2012): 1283-1286.
Mehta et al., "Integrated optical addressing of an ion qubit." Nature Nanotechnology 11.12 (2016): 1066-1070.
Preskill, "Quantum computing and the entanglement frontier." arXiv preprint arXiv:1203.5813 (2012). 18 pages.
Ryou et al., "Control of quantum-confined stark effect in InGaN-based quantum wells." IEEE Journal of Selected Topics in Quantum Electronics 15.4 (2009): 1080-1091.
Saffman et al., "Quantum information with Rydberg atoms." Reviews of Modern Physics 82.3 (2010): 2313. 51 pages.
Saffman, "Quantum computing with atomic qubits and Rydberg interactions: progress and challenges." Journal of Physics B: Atomic, Molecular and Optical Physics 49.20 (2016): 202001. 25 pages.
Saffman, "Quantum computing with neutral atoms." National Science Review 6.1 (2019): 24-25.
Schlosser et al., "Sub-poissonian loading of single atoms in a microscopic dipole trap." Nature 411.6841 (2001): 1024-1027.
Schrader et al., "Neutral atom quantum register." Physical Review Letters 93.15 (2004): 150501. 4 pages.
Sheng et al., "High-fidelity single-qubit gates on neutral atoms in a two-dimensional magic-intensity optical dipole trap array." Physical Review Letters 121.24 (2018): 240501. 6 pages.
Sun et al., "Large-scale nanophotonic phased array." Nature 493.7431 (2013): 195-199.
Wang et al., "Single-qubit gates based on targeted phase shifts in a 3D neutral atom array." Science 352.6293 (2016):1562-1565.
Weiss et al., "Quantum computing with neutral atoms." Physics Today 70.7 (2017). 8 pages.
Xia et al., "Randomized benchmarking of single-qubit gates in a 2D array of neutral-atom qubits." Physical Review Letters 114.10 (2015): 100503. 5 pages.

\* cited by examiner

FIG. 4B Spatial modes

FIG. 6C

For any $n \leq N$, $$L_n = \sum_i^R a_i U_i$$

N-Layer n ↔
M-Layer i ↔

, where $R \leq N$

FIG. 6B

$$\mathcal{M} = U \Sigma^+ V^+$$

$[L_1\ L_2\ \ldots\ L_N] = [U_1\ U_2\ \ldots\ U_R\ \ldots\ U_P]\ \begin{bmatrix}\Sigma_1 & & & & \\ & \Sigma_2 & & 0 & 0 \\ & & \ddots & & \\ & & & \Sigma_R & 0 \\ & & & & \ddots\end{bmatrix}\ \begin{bmatrix}V_1^+ \\ \vdots \\ V_N^+\end{bmatrix}$ $U_1$ ↔ Minimal-Layer 1
$U_2$ ↔ M-Layer 2
$U_R$ ↔ M-Layer R

OPTICAL HOLOGRAPHIC ADDRESSING OF ATOMIC QUANTUM BITS

CROSS-REFERENCE TO RELATED APPLICATION(S)

This application claims the priority benefit, under 35 U.S.C. 119(e), of U.S. Application No. 62/942,273, filed on Dec. 2, 2019, which is incorporated by reference herein in its entirety.

BACKGROUND

Atoms and atom-like quantum emitters can be used as outstanding quantum bits (qubits) for next-generation technologies, such as quantum communication, quantum computing, and quantum sensing. In these applications, optical systems process quantum data registered in the atomic qubits. For instance, optical systems (i) control laser beams to initialize the qubits by optical pumping, (ii) produce laser foci that apply logic operations on target qubits, and (iii) detect photons scattered from qubits, from which the qubit states are determined.

However, an outstanding challenge in these applications is to scale up such optical systems to control hundreds or thousands of quantum nodes. Much of difficulties is due to the demanding spatiotemporal optical-mode complexities of implementing many layers of quantum logic operations on many atomic qubits. Specifically, optical systems should be capable of supporting millions of spatial modes to precisely produce optical focus arrays on target qubits, each of which can be independently and accurately modulated with sub-GHz speed to implement the logic operations. Moreover, such optical systems should be able to handle a few watts of laser power to implement large-scale quantum circuits within the qubits' finite coherence time.

Currently, to the best of our knowledge, there is no such device that can meet all of these demanding needs simultaneously. High-resolution spatial light modulators (SLMs) that support millions of spatial modes are generally too slow. For example, liquid crystal-based SLMs with the SXGA resolution have frame rates of an order of 100 Hz, typically limited by the slow response time of the liquid crystal molecules of individual pixels. High-resolution microelectromechanical systems (MEMS)-based SLMs (e.g., digital micromirror devices, DMDs) have an on-off switching speed of tens of microseconds, and also can suffer from limited light-utilization.

Photonic integrated circuits (PICs) are promising platforms for scalable quantum optical controls. Indeed, coherent control of thousands of beams has been demonstrated for telecommunication light ($\lambda=1.55$ μm). However, undesirable absorption and scattering within photonic structures imposes difficulties in developing large-scale PICs that operate in the visible spectrum, which is where many species of atoms and atom-like quantum emitters have their resonance lines. Another possible approach is to develop arrays of vertical-cavity surface-emitting lasers (VCSELs) for visible light, where each VCSEL is modulated by the quantum-confined Stark effect. Unfortunately, control of such modulator arrays or VCSELs requires massive data bandwidth, which also imposes fundamental challenges on their scalability due to the interconnect bottleneck. For instance, suppose that M qubits are controlled with M optical modulators that are driven by M signals with k-bit precision and a modulation bandwidth of $B=10 \times Q$, where Q is the characteristic quantum logic operation frequency of the quantum systems. Addressing 1000 qubits with $Q=2\pi \times 10$ MHz would require a 1 Tbps data bandwidth, which is prohibitive.

SUMMARY

Here, we introduce optical holographic methods and systems that address the challenges of addressing large arrays of qubits. The temporal-mode complexities of the quantum circuits are holographically encoded into layers of optical spatial-mode distributions. The holographically encoded layers can be individually activated by switching an incident laser beam into a discrete set of spatial modes. These methods and systems can be applied directly to demonstrate quantum supremacy of near-term intermediate noisy atomic quantum computers. Moreover, this technology can also be immediately applied to optically address objects other than atomic qubits, such as nanoparticles and biological cells for optical tweezer and opto-genetics applications, as well as photonic nodes including grating coupler arrays, photodiode arrays, and optical cavity arrays for optical computing and optical neural network applications.

An example method of addressing an array of atomic qubits can be implemented as follows. A laser beam illuminates a first multiplexed hologram in an array of multiplexed holograms. The laser beam diffracts off the first multiplexed hologram to produce a first spatial-mode distribution representing a first layer in a quantum circuit to be executed by the array of atomic qubits. This first spatial-mode distribution illuminates the array of atomic qubits, thereby initializing, manipulating, and/or measuring a first state of the array of atomic qubits.

The laser beam can also illuminate a second multiplexed hologram in the array of multiplexed holograms with the laser beam. The laser beam diffracts off the second multiplexed hologram to produce a second spatial-mode distribution representing a second layer in the quantum circuit. This second spatial-mode distribution illuminates the array of atomic qubits, thereby initializing, manipulating, and/or measuring a second state of the array of atomic qubits.

Illuminating the first multiplexed hologram can occur before or at the same time as illuminating the second multiplexed hologram. Illuminating the first and second multiplexed holograms may comprise directing the laser beam onto a spatial light modulator at first and second angles, respectively.

The laser beam can be switched between the first and second multiplexed holograms in less than 1 microsecond. In some cases, the array of multiplexed holograms is a first array of multiplexed holograms. In these cases, a spatial light modulator displays the first array of multiplexed holograms and is actuated to display a second array of multiplexed holograms at a frame rate of less than 1 kHz.

The laser beam can be a first laser beam at a first frequency, in which case a second laser beam at a second frequency different than the first frequency can illuminate the array of atomic qubits too. This can occur while the first spatial-mode distribution illuminates the array of atomic qubits. A second laser beam can also illuminate the first multiplexed hologram to produce a second spatial-mode distribution for illuminating the array of atomic qubits.

A quantum processor that uses holographic addressing may include a coherent light source, a spatial light modulator (SLM), an optical beam director in optical communication with the light source and the SLM, and an array of atomic qubits, in optical communication with the SLM. In operation, the coherent light source emits a coherent optical beam. The SLM displays holograms encoding respective spatial-mode distributions that represent respective quantum operations. The optical beam director illuminates the holograms with the coherent optical beam, thereby producing the respective spatial-mode distributions. And the array of atomic qubits, which can be a two- or three-dimensional array, carries out the quantum operations in response to being illuminated by the respective spatial-mode distributions.

The coherent light source can emit the coherent optical beam as a pulsed coherent optical beam, in which case the optical beam director can illuminate different holograms with different pulses of the pulsed coherent optical beam to produce a sequence of the spatial-mode distributions representing layers of a quantum circuit. The optical beam director can also illuminate different holograms with different portions of the coherent optical beam simultaneously to illuminate the array of atomic qubits with a superposition of the spatial-mode distributions. The optical beam director may include an optical multi-channel switch, an optical modulator array, an optical beam deflector, and/or a series of free-space optics and optical modulators configured to switch the coherent optical beam among spatial modes in a discrete set of spatial modes. The optical beam can switch the laser beam among the holograms at a rate faster than a frame rate of the SLM. The optical beam director can also illuminate multiple holograms simultaneously so as to illuminate the array of atomic qubits with a coherent superposition of the respective spatial-mode distributions.

The SLM may include a liquid-crystal SLM, a static phase mask, a static amplitude mask, and/or a patterned spinning disk. It can display holograms that are angularly multiplexed Fourier-domain representations of the respective spatial-mode distributions or holograms that are spatially multiplexed real-space-domain representations of the respective spatial-mode distributions. Each spatial-mode distribution may encode a corresponding layer of a quantum circuit.

All combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. Terminology explicitly employed herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 4B shows how a spatial-mode distribution $\mathcal{E}^{(m)}(r)$ can be mapped into a Fourier-domain computer-generated holograms (CGHs) $\phi^{(m)}(u)$.

Figures 4A, 4C:
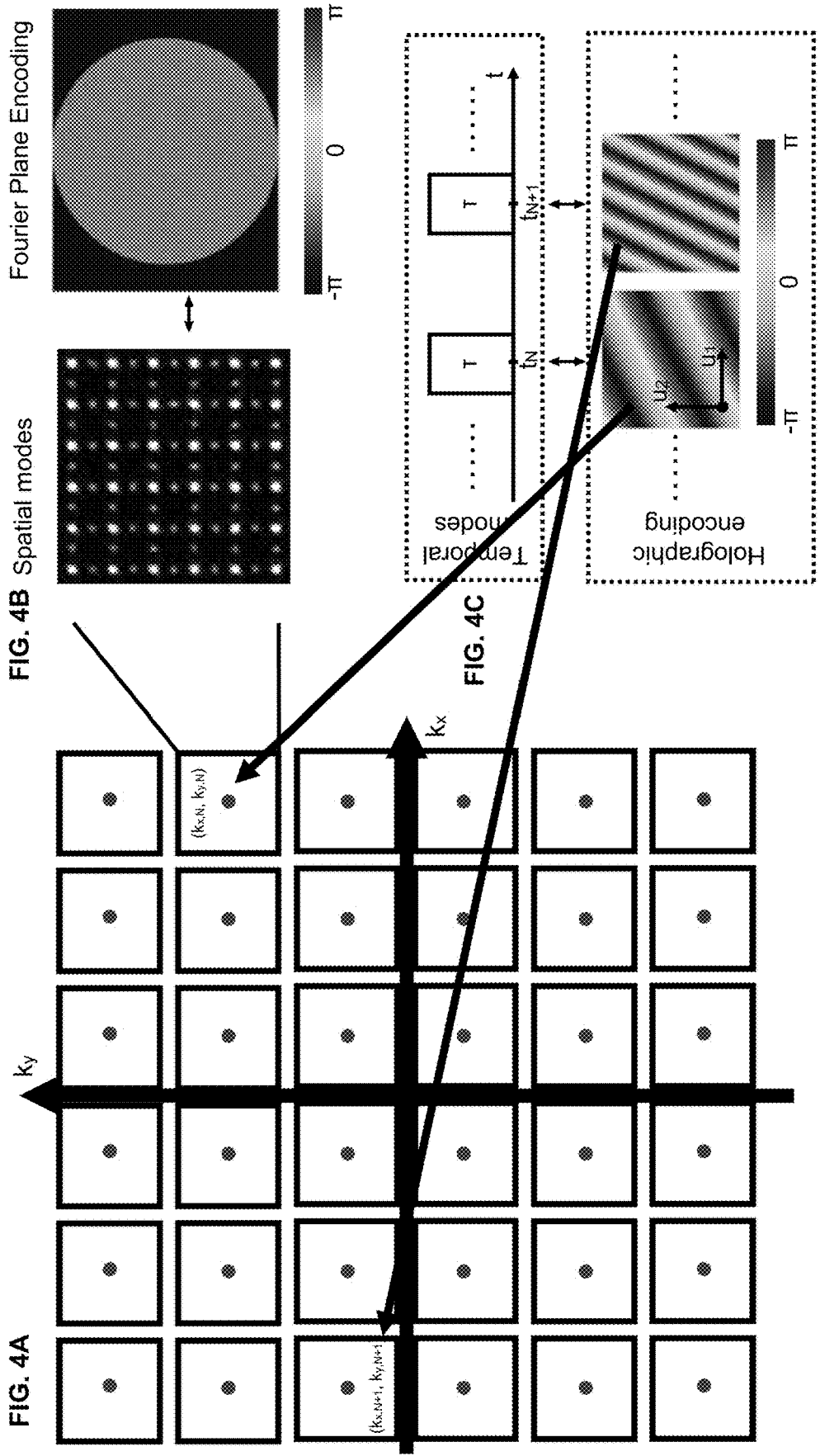
FIG. 4A illustrates how spatial-mode distributions $\{\mathcal{E}^{(m)}(r)\}$ can be patched within spatial-mode space.

FIG. 4C describes how individual CGHs are coherently excited with the transverse Fourier modes in a discrete time sequence (here, $t_N$ and $t_{N+1}$) to holographically implement temporal-mode complexities.

Figure 5:
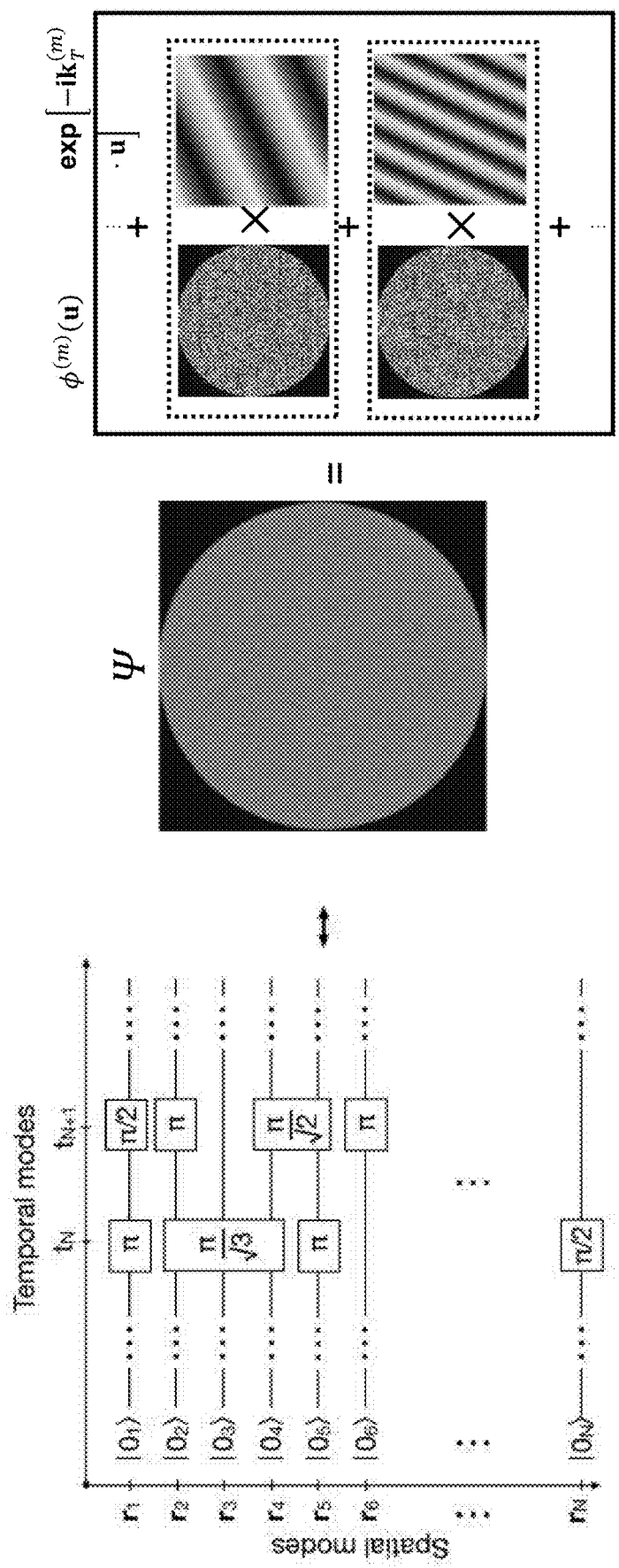

FIG. 5 illustrates the relationship between spatio-temporal modes of a quantum circuits and their Fourier-domain holographic representation $\Psi$.

Figure 6A:
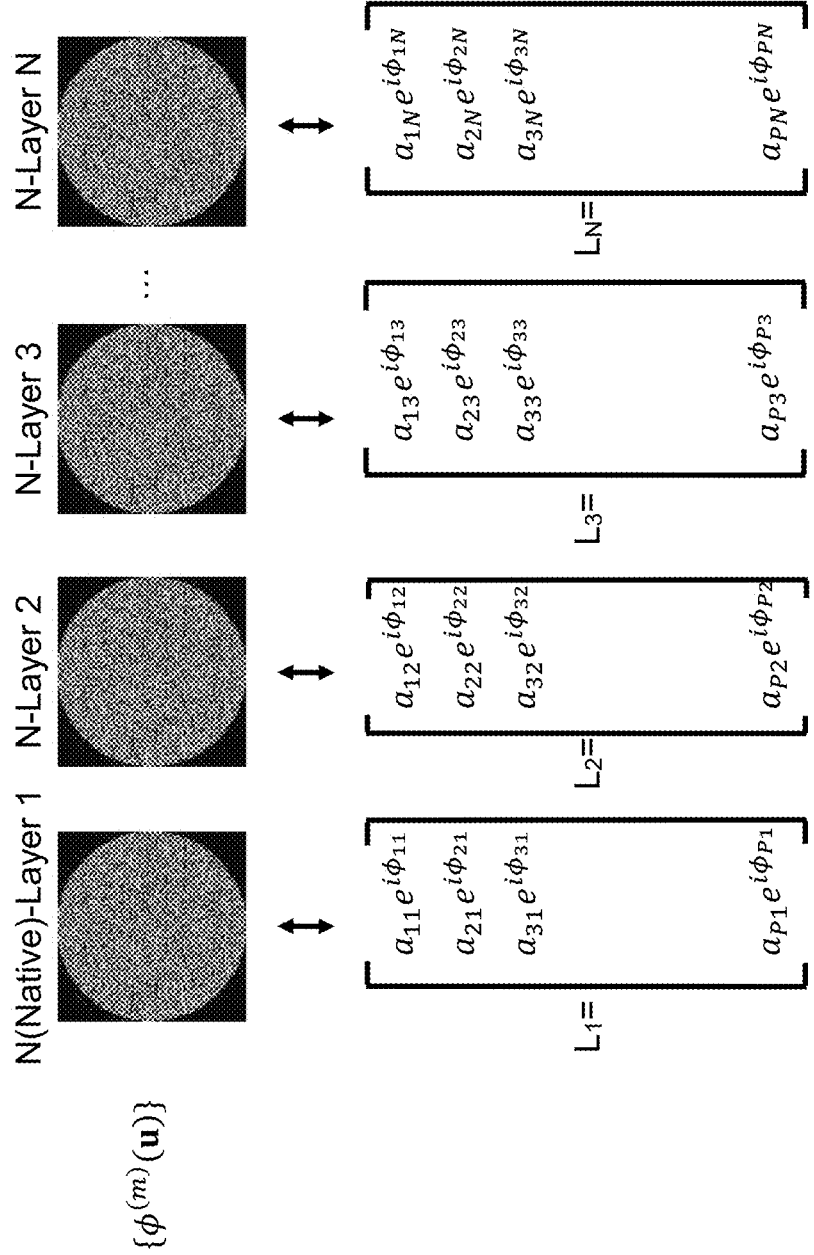

FIG. 6A shows a column-vector representation $\{L^{(m)}(u)\}$ of a set of CGHs $\{\phi^{(m)}(u)\}$ that encode the layers of quantum circuits, where P is the number of pixels that display CGHs.

FIG. 6B illustrates how to identify the minimal number of CGHs to implement quantum circuit using singular value decomposition from the column-vector representations in FIG. 6A.

FIG. 6C illustrates how to coherently mix the CGHs identified in FIG. 6B to implement a particular layer of a quantum circuit.

Figure 7:
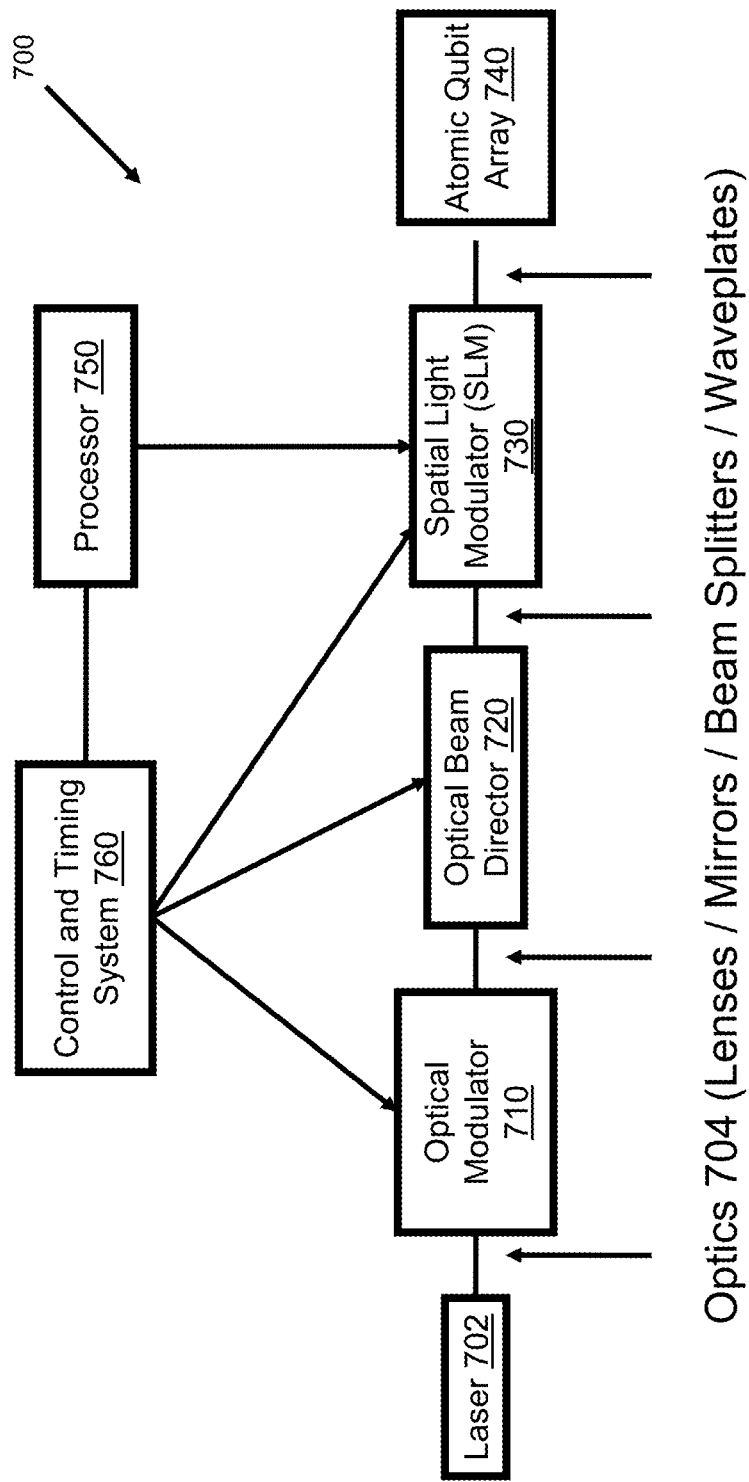

FIG. 7 shows a block diagram of a system that holographically encodes and implement spatio-temporal mode complexities of a quantum circuit on an array or atomic or atom-like qubits.

Figure 8A:
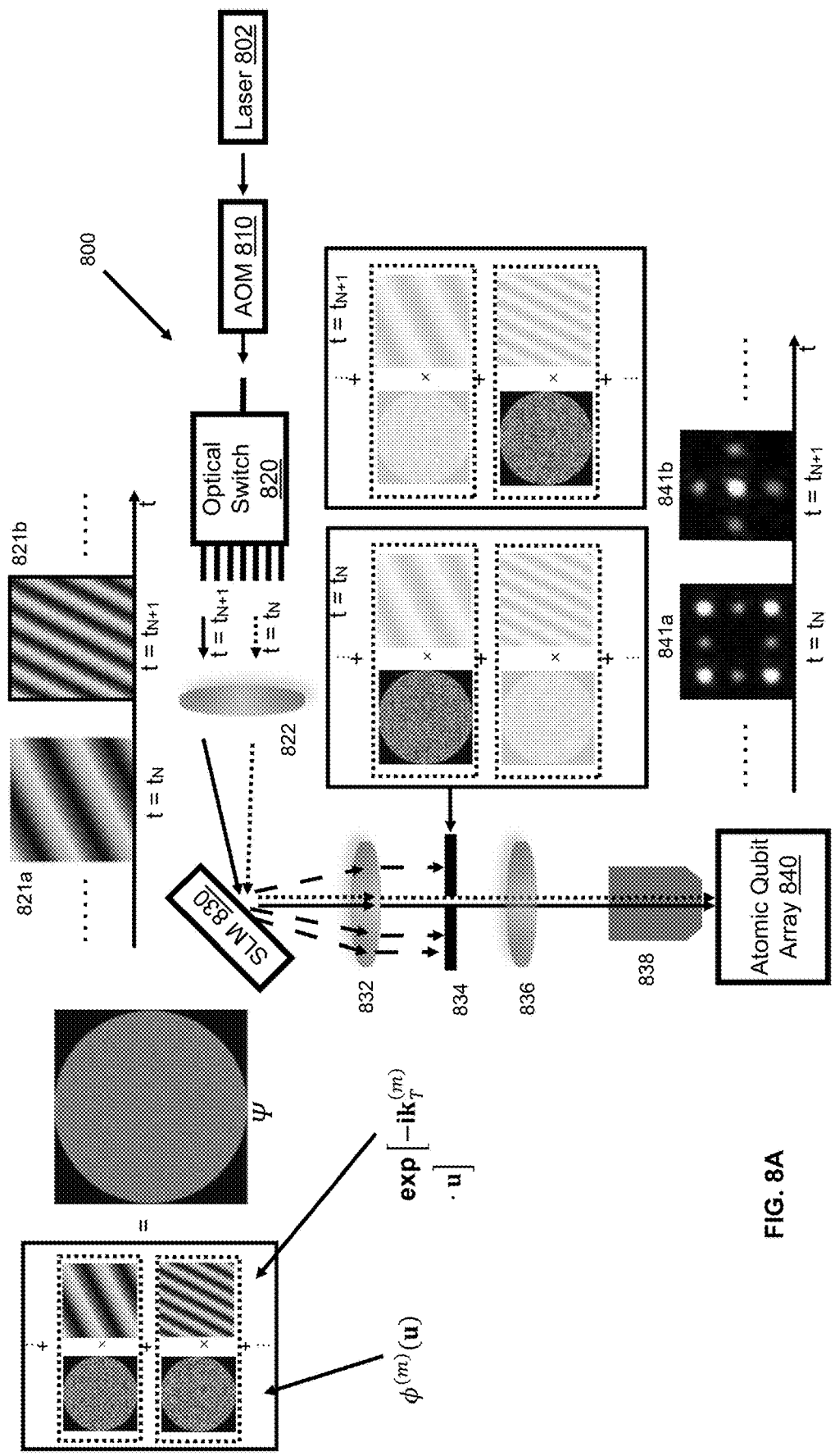

FIG. 8A illustrates a system configured to implement a quantum circuit holographically encoded in the optical Fourier domain.

Figure 8B:
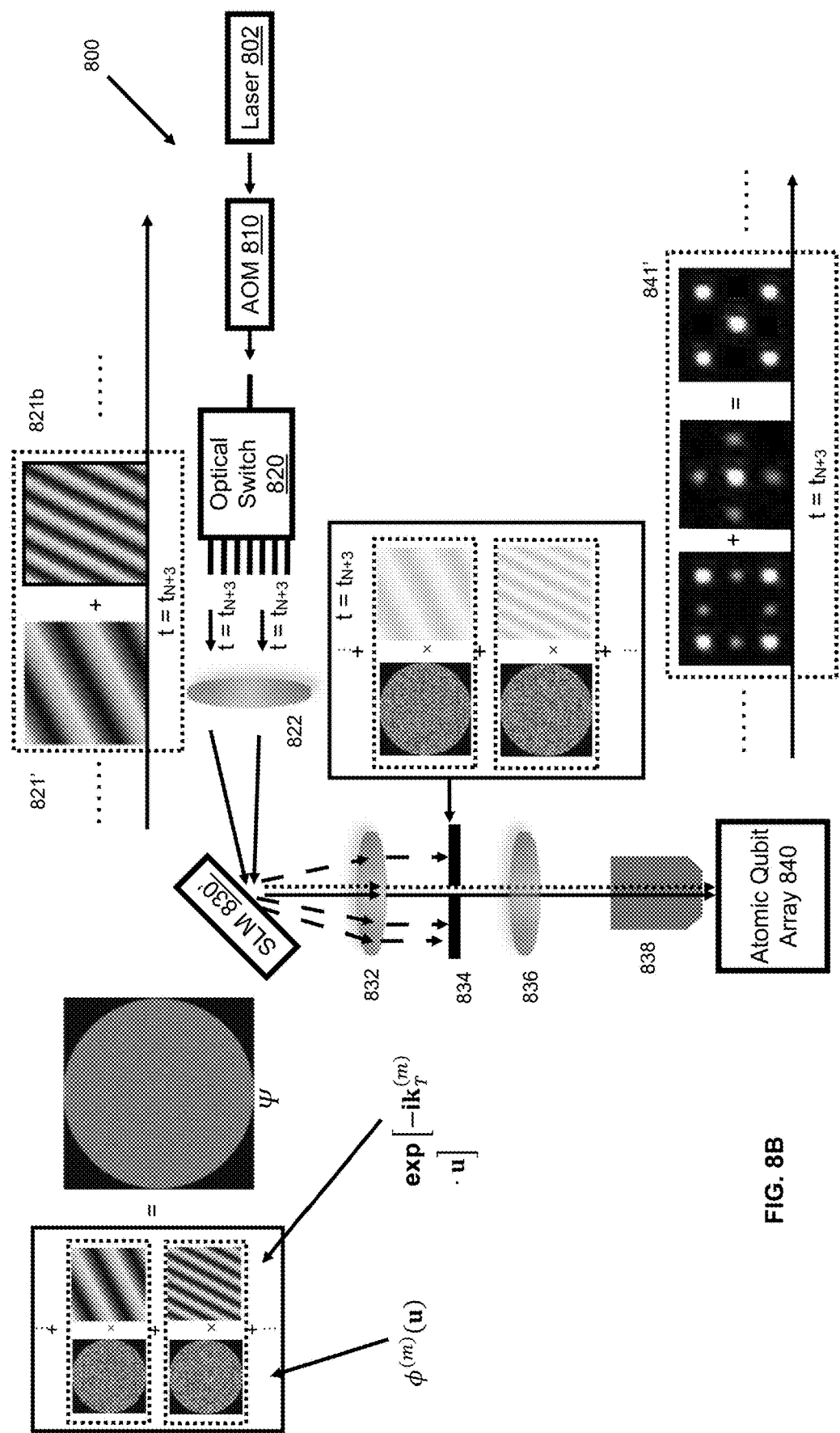

FIG. 8B illustrates how to create a coherent superposition between two spatial-mode distributions to produce a new spatial-mode distribution in the system of FIG. 8A.

Figure 9:
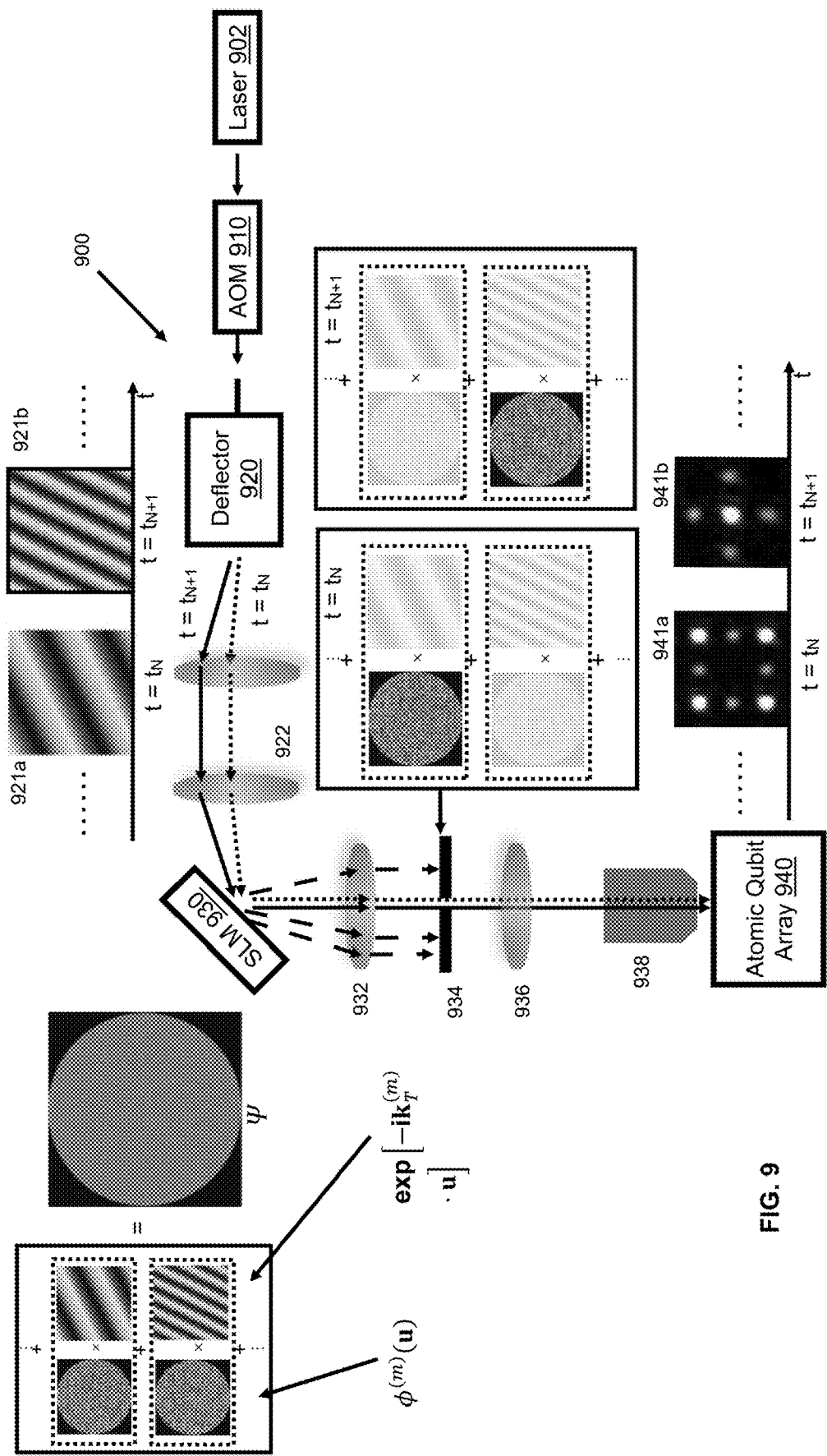

FIG. 9 illustrates a system configured to implement a Fourier-domain holographic representation $\Psi$ of a quantum circuit using an optical deflector.

Figure 10:
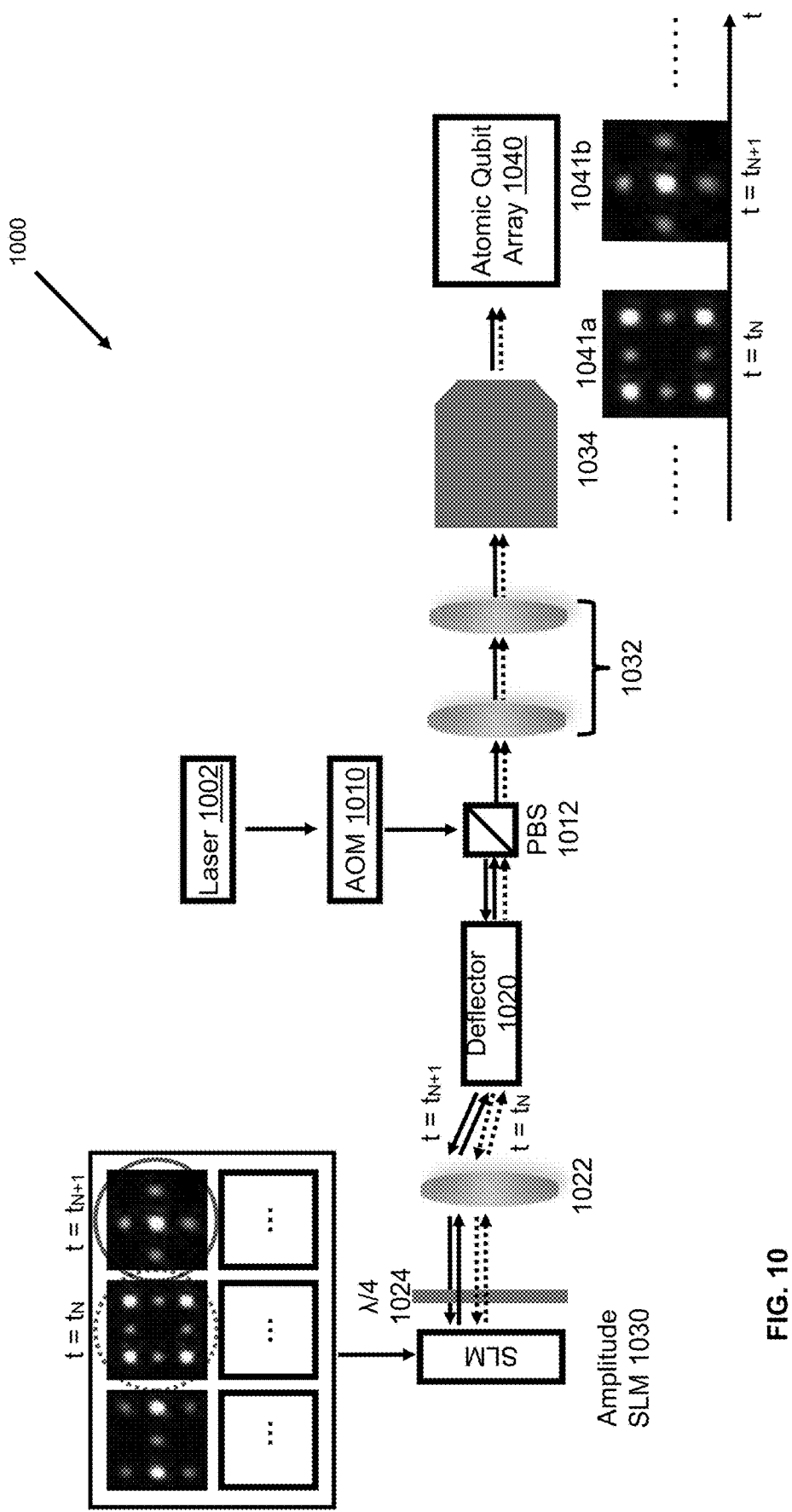

FIG. 10 illustrates a system that implements the holographic representation of a quantum circuit in the real-space domain, which is equivalent to the Fourier-domain representation $\Psi$, with an amplitude SLM.

Figure 11:
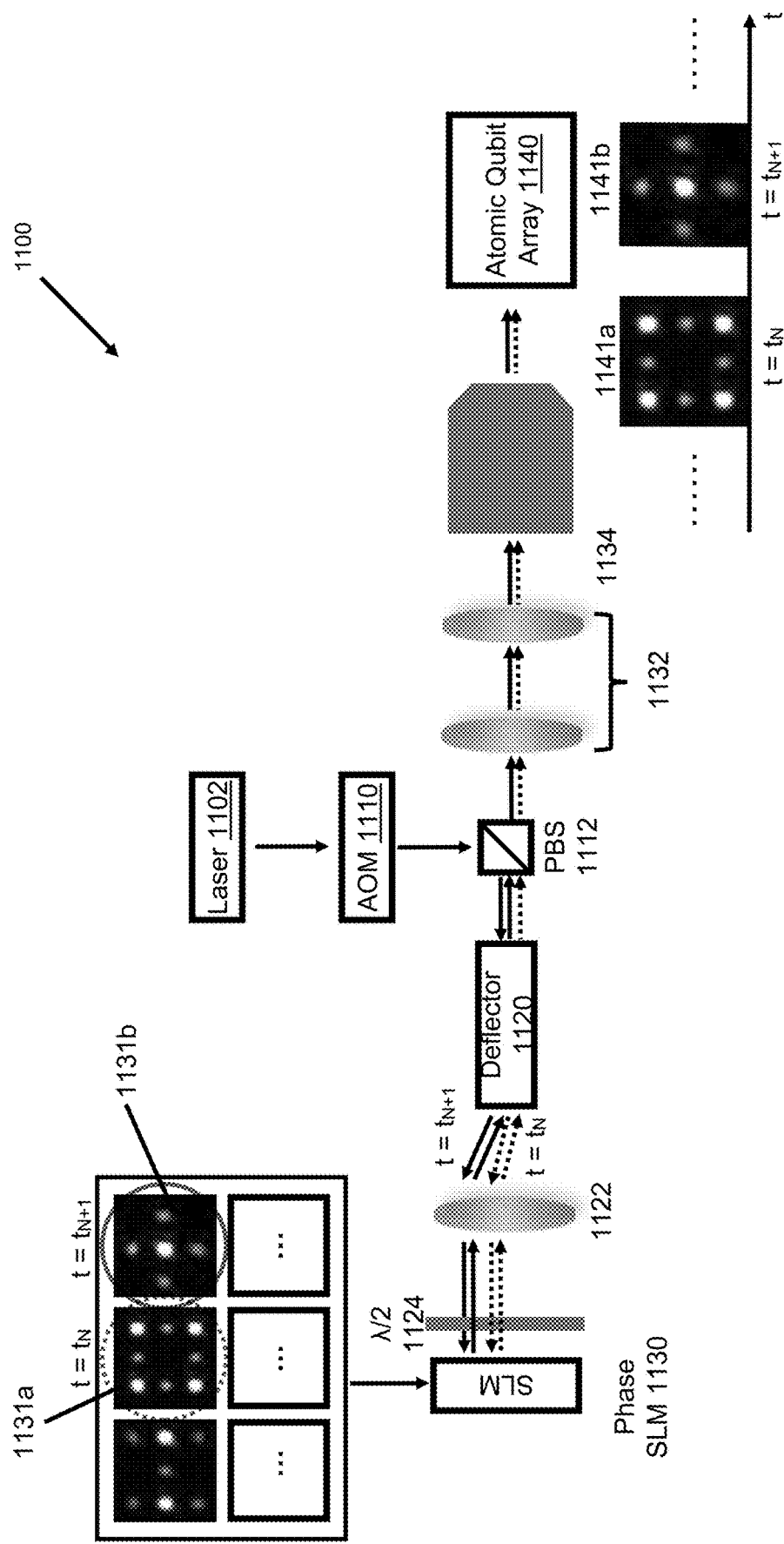

FIG. 11 illustrates a system configured to implement the holographic representation of a quantum circuit in the real-space domain with a phase SLM.

Figure 12:
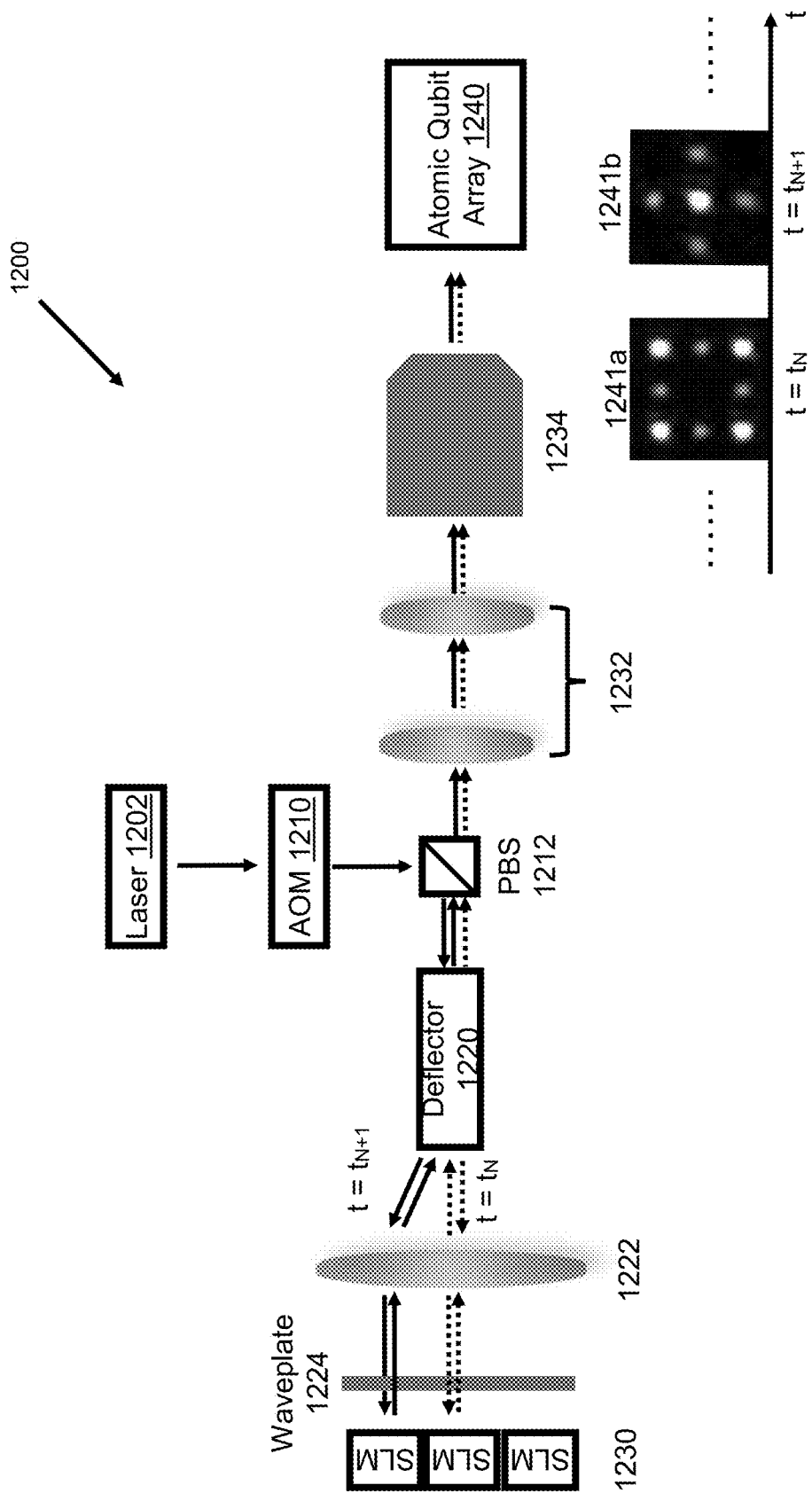

FIG. 12 illustrates a system configured to implement the holographic representation of a quantum circuit in the real-space domain with multiple discrete SLMs.

DETAILED DESCRIPTION

Encoding spatio-temporal modes of quantum circuits holographically as spatial-mode distributions increases access speeds for addressing two- or three-dimensional arrays of atomic qubits by orders of magnitude. In a holographic addressing scheme, the layers of a quantum circuit are encoded as hundreds or thousands respective angularly or spatially multiplexed computer-generated hologram (CGHs) in a static or dynamic spatial light modulator (SLM). An optical beam director, such as an optical multi-channel switch, optical modulator array, optical beam deflector, or optical system including a series of free-space optics and optical modulators to switch the incident laser beam into a discrete set of transverse spatial modes, probes the SLM with a laser beam that can be switched through different angles or positions at kilohertz or megahertz rates. The laser beam diffracts off the different CGHs to produce spatial modes that illuminate the array of atomic qubits. The sequence of spatial modes corresponds to a sequence of layers for implementing a particular quantum circuit, but at a rate equal to the kilohertz or megahertz switching speed of optical switch or deflector instead of the much slower refresh rate of the SLM.

Holographic addressing of atomic qubit arrays has at least four advantages over conventional addressing schemes. First, holographic addressing can be much faster than steering beams directly with liquid crystal SLMs or DMD devices. Liquid crystal SLMs and DMD devices have switching speeds on the order of hundreds of hertz or kilohertz, whereas the switching speed of a holographic addressing scheme can reach hundreds of kilohertz or even megahertz.

Second, holographic addressing consumes much less bandwidth than using modulator arrays for a given quantum circuit and switching speed. In a quantum circuit with a width N and depth D, a conventional addressing scheme using N independent optical modulators typically uses a data bandwidth of 10×N×Q×k, where Q is the characteristic logic operation frequency of the quantum systems (the Rabi frequency), and k is the desired bit precision of the modulation signals. However, a holographic addressing scheme encodes the k-bit precision on the stationary amplitudes of spatial modes and implements each logic layer by simply switching the incident laser beam into different set of transverse modes in a binary manner. This reduces the data bandwidth to D×Q. Addressing 1000 qubits with Q=2π×10 MHz in a holographic addressing scheme uses a 10 Gbps data bandwidth compared to the 1 Tbps data bandwidth used by the conventional approach.

Third, a holographic addressing system has fewer noise sources than a system that uses one modulator per atomic qubit. A holographic addressing can use a single SLM and a single optical switch, which together replace many optical modulators and their individual RF sources and electronics (e.g., amplifiers and switches). This reduction in the number of discrete components significantly reduces the number of independent noise sources and makes any residual noise global. This reduction makes the noise tractable and easier to be compensated with feedforward and/or feedback control.

Fourth, holographic addressing can be used to address three-dimensional (3D) arrays of qubits. This capability uniquely enables addressing atomic qubits in a geometric 3D topology that has better qubit connectivities. In particular, each CGH can encode a 3D spatial-mode distribution that can be tailored to address a 3D array of dozens to hundreds or even thousands of atomic qubit. Addressing such a large 3D arrays with conventional schemes would be impractical, at best, given the optics for focusing modulated beams at the different focal planes within the array.

Holographic Representations of Quantum Circuits

Consider the following analytical derivation of a holographic representation of one or more quantum circuits and its implementation on an atomic qubit array. The state of an atomic qubit located at the spatial position $r_n$ within the array is denoted as $|\psi_n\rangle$. The qubit states $|0_n\rangle$ and $|1_n\rangle$ can be the ground-state hyperfine sublevels or the ground and highly excited Rydberg states, for example. The states $\{|\psi_n\rangle\}$ of the atomic qubits can be initialized into $\{|0_n\rangle\}$ by optically pumping all of the atomic qubits with a global resonant laser beam or an array of resonant optical foci.

Figure 1A:
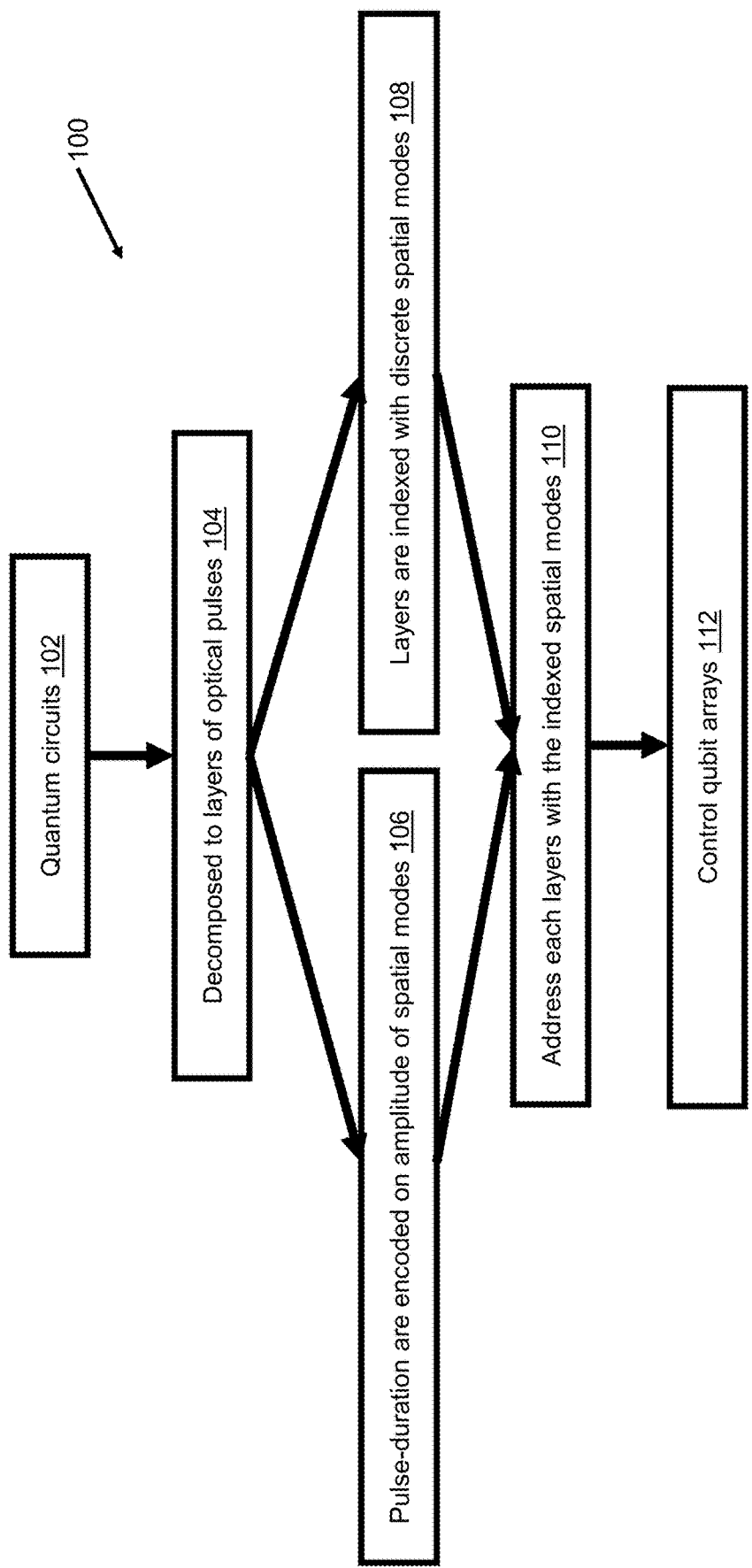
FIG. 1A is a flow chart illustrating how to holographically implement quantum circuits on atomic qubit arrays.

FIG. 1A illustrates a process 100 for holographic encoding and addressing of quantum circuits 102. A quantum circuit $\mathcal{U}$ with a depth D (equal to the number of logic layers in the quantum circuit) and a width N (equal to the number of qubits in the atomic qubit array) can be described with D layers, which include a combination of single- or multi-qubit gates for disjoint atomic qubits at respective spatial positions $r_1, r_2, \ldots,$ and $r_N$. A realistic near-term quantum circuit, such as the one that implements the quantum approximate optimization algorithms (QAOAs), can find an approximate solution of combinatorial optimization problems with two or more layers. The d-th layer of the D logic layers, denoted as $\mathcal{U}_d$ (d=1, 2, ..., D), can be further decomposed into $K_d$ sublayers of an optical spatio-temporal mode distribution $E^{(d,k)}(r, t_k)$ (complex amplitude) such that (104):

$$\mathcal{U}_d = \prod_{k=1}^{K_d} E^{(d,k)}(r, t_k) =$$

$$\prod_{k=1}^{K_d}\left[\sum_{n=1}^{N} \mathcal{O}_n^{(d)}(t_k)U(r-r_n)\right] = \sum_{n=1}^{N}\left[\prod_{k=1}^{K_d} \mathcal{O}_n^{(d)}(t_k)\right]U(r-r_n).$$

Here, $\mathcal{O}$ (d) is the complex amplitude of a spatiotemporal mode at spatial position $r_n$ and time $t_k$ within the d-th logic layer. The spatial-mode basis $U(r)$ is an optical microscope diffraction function centered at r=0, whose tail on neighboring quantum nodes is ignored. Conventionally, the duration of $\mathcal{O}_n^{(d)}$ is controlled to apply quantum gates on the qubit $r_n$ with a high modulation bandwidth and high precision.

In this holographic addressing process 100, instead of encoding the quantum gates on the duration of $\mathcal{O}_n^{(d)}$, the quantum gates are encoded on the relative amplitude $\mathcal{O}_n^{(d)}$ with high precision along with a single unit-pulse duration, for example, $|\mathcal{O}_n^{(d)}(t_k)|\in\{1,1/2,1/N\}$, corresponding to $\{\pi, \pi/2, \pi/N\}$ pulses, respectively. The unit pulse duration $\tau$ is determined so that $\max(\mathcal{O}_n^{(d)})\tau/2=1\times\tau/2=\pi$ (the factor of ½ accounts for the rotating wave approximation). In this way, the spatiotemporal-mode distribution $E^{(d,k)}(r,t_k)$ of each layer is now encoded to a spatial-mode distribution $\mathcal{E}^{(d,k)}(r)\doteq\sum_{n=1}^{N}\mathcal{O}_n^{(d)}(t_k)U(r-r_n)$ (106). In summary, the layers of the quantum circuit are holographically encoded into $\mathcal{D}$ ($\doteq\sum_{d=1}^{D}K_d\geq D$) layers of a spatial-mode distribution $\mathcal{E}^{(m)}(r)\doteq\mathcal{E}^{(d,k)}(r)$, where the dummy indices (d,k) are replaced by a single index m=1, 2, 3, ... $\mathcal{D}$ for convenience. The $\mathcal{D}$ layers of the spatial-mode distribution $\mathcal{E}^{(m)}(r)$ can be patched into a massive spatial-mode space $\mathcal{S}$, which can be simultaneously programmed in and later retrieved from one or more SLMs (108). The layers can be sequentially activated with an orthogonal set of transverse modes of an incident laser beam (110) for controlling a qubit array (112).

Figure 1B:
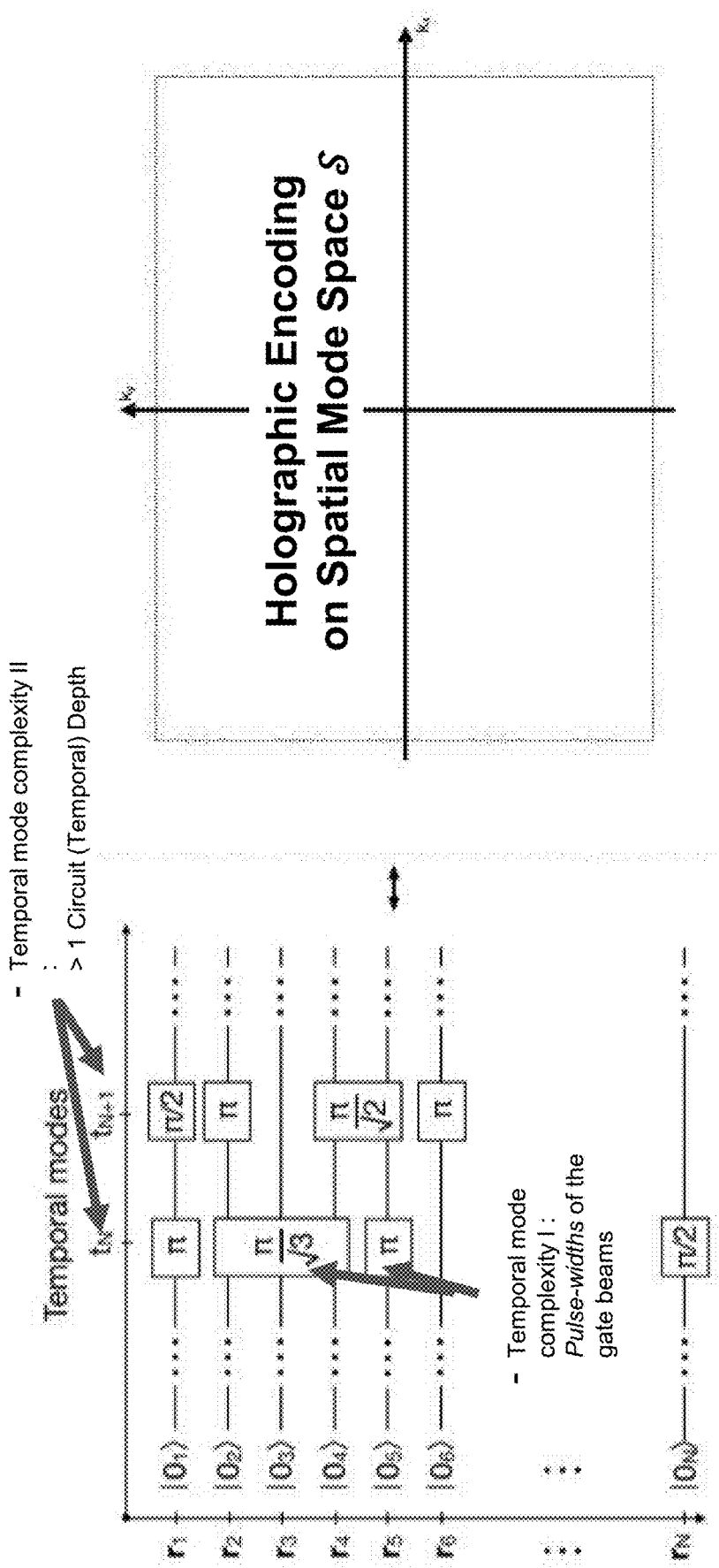
FIG. 1B illustrates the two temporal-mode complexities in implementing a quantum circuit.

FIG. 1B shows how two layers of a quantum circuit can be represented as temporal mode complexities (left) that map to the spatial-mode space $\mathcal{S}$ (right). In this example, each layer is represented by pulses of different widths (here, π, π/2, π/√2, π/√3 pulses) applied at different times $t_N$, $t_{N+1}$ that act on atomic qubits at different spatial positions $r_1, r_2, \ldots,$ and $r_N$. (Here, π/N refers to the angle of qubit rotation on the Bloch sphere.) The temporal mode complexities refer to the multiple temporal layers, each of which comprises multiple pulses with different pulse durations. Put differently, the first temporal mode complexity refers to implementing one layer of the quantum circuit (e.g., at time $t_N$) with heterogeneous pulse durations (e.g., $\pi$, $\pi/2$, $\pi/\sqrt{3}$) on atomic qubits positioned at $r_1, r_2, \ldots,$ and $r_N$. Different pulse durations correspond to different types of native gates that operate on these atomic qubits. Second, different temporal layers (e.g., the layers at times $t_N$, $t_{N+1}$) include different combinations of native gates with different pulse durations. These two temporal-mode complexities can be holographically encoded in massive optical spatial-mode space $\mathcal{S}$.

Figure 2B:
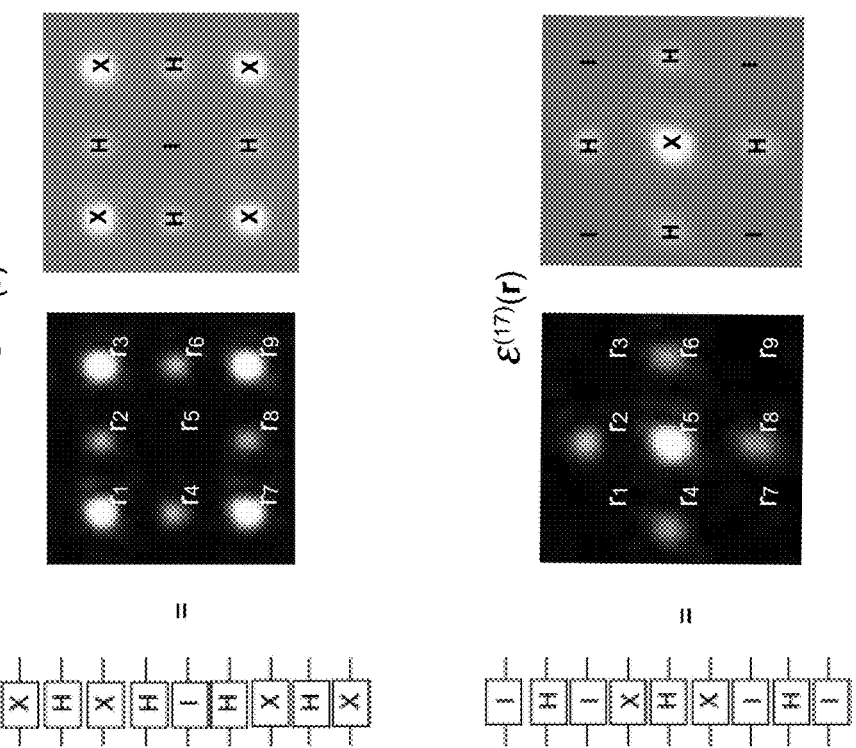
FIG. 2B illustrates how the layers of quantum circuit in FIG. 2A can be encoded into the relative intensities of spatial modes for addressing the atomic qubits.
Figure 2A:
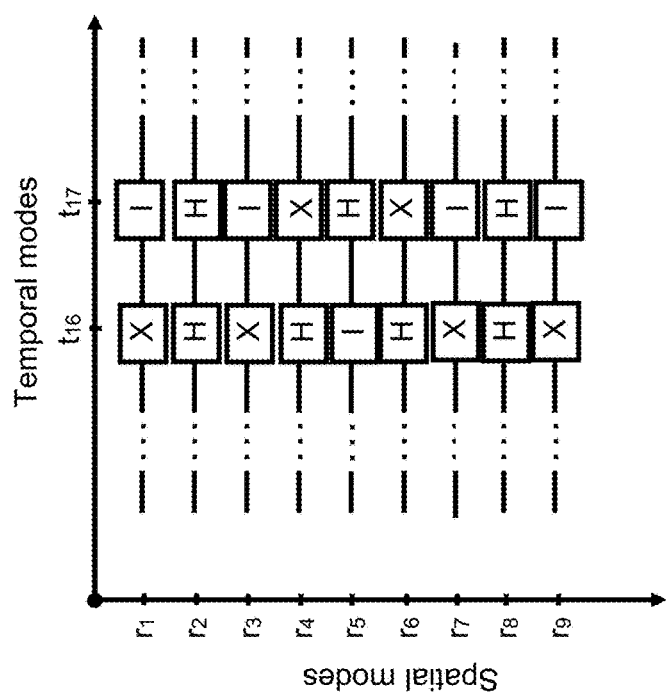
FIG. 2A is an example of quantum circuits that address atomic qubits at locations $r_1$, $r_2$, $r_9$.

FIGS. 2A and 2B illustrate temporal and spatial representations, respectively, of another quantum circuit that addresses atomic qubits at $r_1, r_2, \ldots r_9$. In FIG. 2A, this circuit is represented discrete temporal layers of native gates such as Hadamard (H), bit-flip (X), and identity (I) gates that are applied on the atomic qubits. Each gate may have a different pulse duration. For example, the H, X, and I gates have pulse durations of $\pi/2$, $\pi$, and Null, respectively. These temporal layers, which have heterogeneous pulse durations, are encoded into the spatial-mode distributions $\{\mathcal{E}^{(m)}(r)\}$ with spatial-basis modes centered at $r_1, r_2, \ldots,$ and $r_9$ as shown in FIG. 2B. The spatial-mode distributions encode the heterogeneity of the pulse durations in the temporal layers as heterogeneous amplitude distributions. Put differently, FIG. 2B illustrates how the different combinations of gates in the different temporal layers are encoded into the relative intensities of the spatial-basis modes, with a dimmer spatial mode corresponding to a shorter pulse duration.

Figure 3:
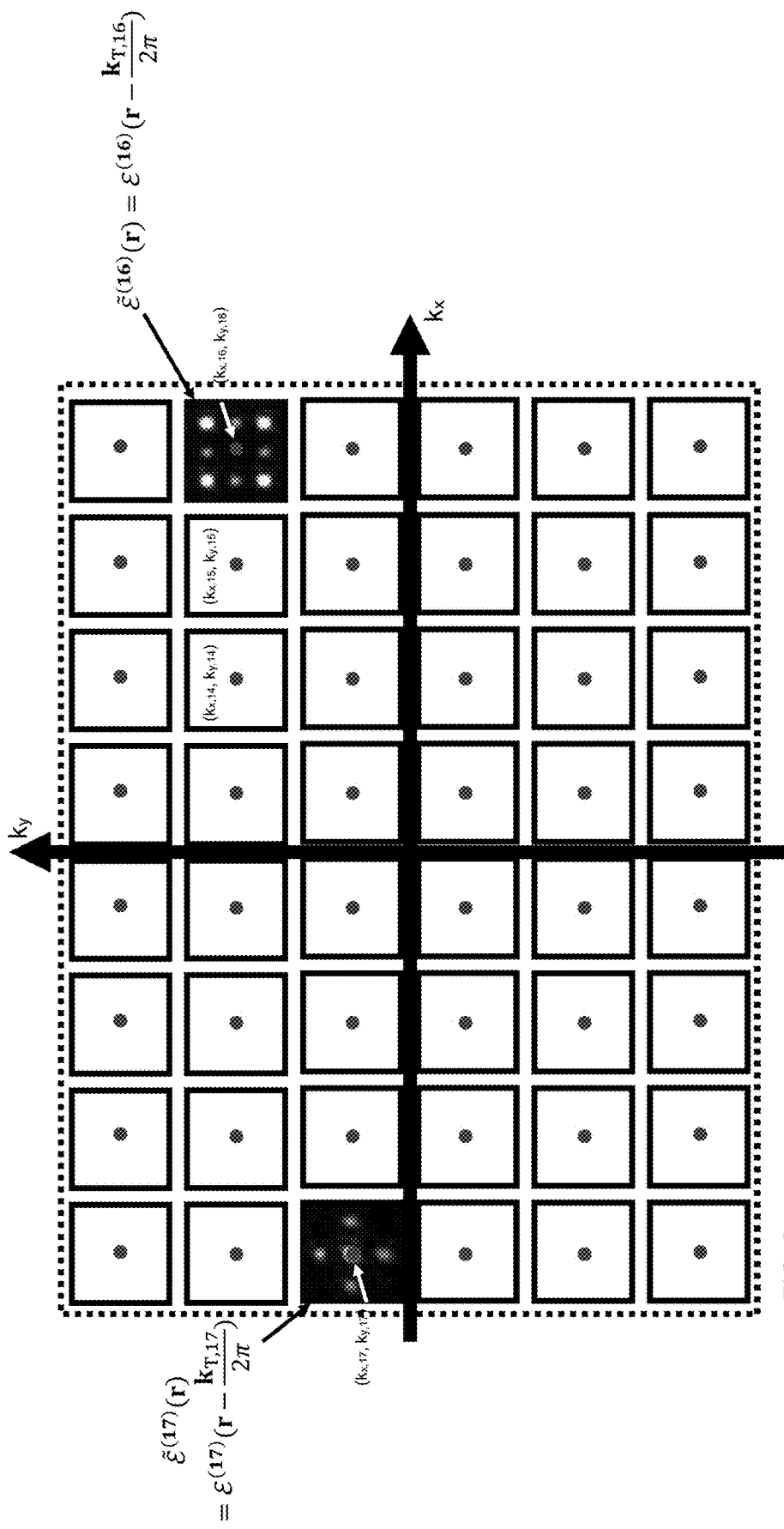
FIG. 3 illustrates how the layers of spatial-mode distributions $\{\mathcal{E}^{070}(r)\}$ are patched within spatial-mode space.

FIG. 3 illustrates how the layers of spatial-mode distributions $\{\mathcal{E}^{(m)}(r)\}$ can be patched to a subspace centered at $\{k_T^{(m)}=(k_{x,m},k_{y,m})\}$ of the optical spatial-mode space $\mathcal{S}$. The patched spatial-mode distributions $\{\tilde{\mathcal{E}}^{(m)}(r)\}$ can be displayed on a static or dynamic SLM. The layers of the patched distribution $\{\tilde{\mathcal{E}}^{(m)}(r)\}$ in the SLM can be addressed with a set of orthogonal transverse Fourier modes $\{k_T^{(m)}=(k_{x,m},k_{y,m})\}$ to reproduce the respective spatial-mode distributions for addressing the atomic qubit array.

FIGS. 4A-4C illustrate how the layers of spatial-mode distributions $\{\mathcal{E}^{(m)}(r)\}$, such as those in FIG. 3, can be encoded in Fourier-domain CGHs. As shown in FIGS. 4A and 4B, the set of spatial-mode distributions $\{\mathcal{E}^{(m)}(r)\}$ is mapped into the set of computer-generated holograms (CGHs) $\{\phi^{(m)}(u)=FT[\mathcal{E}^{(m)}(r)]\}$, one of which is shown in FIG. 4B. (Here, the u-plane is the conjugate plane of the r-plane). The CGHs $\{\phi^{(m)}(u)\}$ that encode the spatial-mode distributions $\{\mathcal{E}^{(m)}(r)\}$ can be determined with the method described in D. Kim et al., "Large-scale uniform optical focus array generation with a phase spatial light modulator," *Optics Letters* 44 3178 (2019), which is incorporated herein by reference in its entirety. Here, u is the transverse coordinate of the SLM plane, which is the conjugate focal plane of r, the plane containing the atomic qubit array.

Next, the CGHs are patched to a set of subspace centered at $\{k_T^{(m)}=(k_{x,m},k_{y,m})\}$ within the optical spatial-mode space $\mathcal{S}$. The patching in the Fourier domain is done by multiplying $\{\phi^{(m)}(u)\}$ with the corresponding transverse Fourier mode $\exp[-ik_{(T)}^{(m)} \cdot u]$ (a tilted plane wave):

$$\tilde{\phi}^{(m)}(u)=\phi^{(m)}(u)\times\exp[-ik_T^{(m)} \cdot u]. \quad (1)$$

Here, $k_T^{(m)}$ is the transverse wavevector, which is assigned to the m-th temporal layer at time $t_m$. The set $\{\tilde{\phi}_{(m)}(u)\}$ encodes the $\mathcal{D}$ layers of $\mathcal{E}^{(m)}(r)$ that are patched into the spatial-mode space $\mathcal{S}$. A single CGH $\Psi(u)=\sum_{m=1}^{\mathcal{D}} \tilde{\phi}^{(m)}(u)$ is the holographic representation of the quantum circuit $\mathcal{U}$. The resulting holographically encoded quantum circuit $\Psi$ can be programmed into one or more high-resolution static or dynamic SLMs. An optical beam director sequentially coherently excites the CGHs $\{\tilde{\phi}^{(m)}(u)\}$ with the transverse Fourier modes at discrete times (FIG. 4C shows excitations with different Fourier modes at times $t_N$ and $t_{N+1}$) to implement the different layers of the quantum circuit.

Moreover, the single phase-only CGH $\Psi(u)$ can be also directly determined from the patched spatial-mode distribution $\{\tilde{\mathcal{E}}^{(m)}(r)\}$ via the method described in D. Kim et al., "Large-scale uniform optical focus array generation with a phase spatial light modulator," *Optics Letters* 44 3178 (2019). Fourier-transforming the diffraction from this phase-only hologram with a lens creates the desired intensity (E-field) pattern of $\mathcal{E}^{(m)}(r)$ on a qubit array. The quantum circuit layers can also be implemented by spatially modulating the amplitude of the laser beam with the real-space representation $\{\tilde{\mathcal{E}}^{(m)}(r)\}$ using an amplitude modulator positioned in an image plane of the atomic qubit array as described below.

The phase-only CGHs can be also effectively implemented within a binary "amplitude" SLMs (i.e., an SLM with on/off amplitude modulation) via the method introduced in D. Kim et al., "Implementing transmission eigenchannels of disordered media by a binary-control digital micromirror device," *Optics Communications* 330, 35-39 (2014), which is incorporated herein by reference in its entirety. Super-pixel methods can be also used for the effective binary amplitude encoding. In addition, a binary amplitude representation of $\{\tilde{\phi}^{(m)}(u)\}$ can also be printed as a form of lithography mask, which can be substituted for the binary amplitude SLM. Another extension of this printing approach is to write the binary representation of $\{\tilde{\phi}^{(m)}(u)\}$ directly on the surface of the spinning disk. Finally, $\{\tilde{\phi}^{(m)}(u)\}$ can be represented as discrete-level phase CGHs, which can be also lithographically printed into diffraction optical elements and similarly implemented as binary amplitude masks.

FIG. 5 illustrates the Fourier-domain holographic representation $\Psi$ of the quantum circuit $\mathcal{U}$. Again, a temporal layer of the quantum circuit $\mathcal{U}$ at $t=t_m$, is holographically encoded into a patched CGH $\tilde{\phi}(u)$. The patched CGHs $\{\tilde{\phi}^{(m)}(u)\}$ are coherently superposed to form the holographic representation $\Psi$ of the quantum circuit $\mathcal{U}$. This single hologram $\Psi$ also equivalently represents the patched spatial-mode distributions $\{\tilde{\mathcal{E}}^{(m)}(r)\}$ and can be displayed on an SLM. The layers $\tilde{\phi}^{(m)}(u)$ of the CGH $\Psi(u)$ can be excited individually and sequentially with a fast optical beam director, such as an optical multi-channel switch or optical beam deflector. For example, the incident laser beam may be switched to the transverse spatial mode of $k_T^{(m')}$, which couples only the target CGH $\tilde{\phi}^{(m')}(u) \in \{\tilde{\phi}^{(m)}(u)\}$ to the optical microscope and subsequently to the atomic qubit array.

The phase of Fourier mode in Eq. (1) is conjugated to the incident Fourier mode of $k_T^{(m)}$. For a laser beam an incident on the CGH with a spatial frequency $k_T^{(m)}$ at time $t_m$, this phase conjugation allows the target CGH $\tilde{\phi}^{(m)}(u)$ to be aligned along the optical axis by spatial demodulation. In contrast, diffractions from non-targeted CGHs ($m \neq m'$) of $\{\tilde{\phi}^{(m)}(u)\}$ are separated from the optical axis and spatially filtered out with a spatial filter. In this way, the target CGH $\tilde{\phi}^{(m)}(u)$ is coupled to the microscope objective-lens at time $t_m$, projecting its corresponding spatial-mode distribution $\mathcal{E}^{(m)}(r)$ to the atomic qubit array.

The holographic representation $\Psi(u)$ of the quantum circuit can be equivalently encoded in the real-space domain. The two-dimensional inverse Fourier transform (IFT) of $\Psi(u)$ is $$IFT[\Psi(u)] = IFT \sum_{m=1}^{\mathcal{D}} \phi^{(m)}(u) \times \exp[-ik_T^{(m)} \cdot u] = \sum_{m=1}^{\mathcal{D}} \varepsilon^{(m)}(r - r_m) \doteq \sum_{m=1}^{\mathcal{D}} \tilde{\varepsilon}^{(m)}(r),$$

where $r_m = k_T^{(m)}/2\pi$. Implementing $\Psi(u)$ in the real-space domain is equivalent to displaying the patched spatial-mode distribution $\{\tilde{\mathcal{E}}^{(m)}(r)\}$ with an SLM. Each patched CGH $\tilde{\mathcal{E}}^{(m)}(r)$ is individually and sequentially activated with a fast optical beam director: a deflected laser beam with the spatial frequency $k_T^{(m')}$ illuminates the target CGH $\tilde{\mathcal{E}}^{(m')}(r) \in \{\text{E} \tilde{\mathcal{E}}^{(m)}(r)\}$ and subsequently couples the target CGH to the atomic qubit array through the optical microscope.

Coherent Mixers: CGH Superposition Methods

An appropriately actuated optical beam director can simultaneously produce multiple transverse Fourier modes that are phase coherent with each other. Each transverse mode $k_T^{(m)}$ projects its corresponding CGH $\tilde{\phi}^{(m)}(u)$ to the qubit array, creating a superposition of multiple modes $\{k_T^{(m)}\}$ whose CGHs $\{\tilde{\phi}^{(m)}(u)\}$ mix coherently to produce a spatial-mode distribution that is not among the $\mathcal{D}$ layers of $\mathcal{E}^{(m)}(r)$. For quantum circuits with symmetries among the layers of $\{\mathcal{E}^{(m)}(r)\}$, this coherent mixing may reduce the number of CGH elements $\{\tilde{\phi}^{(m)}(u)\}$ needed to be displayed by the SLM to produce a particular spatial-mode distribution. This is in turn may reduce the computation time for reconfiguring the SLM and increase the light utilization efficiency. For example, an SLM can display a basis set of CGHs that reduces or minimizes the number of orthogonal modes to represent $\{\mathcal{E}^{(m)}(r)\}$. Then, a combination of the incident transverse modes selectively mixes the basis CGHs to cover the $\mathcal{D}$ layers of $\mathcal{E}^{(m)}(r)$.

FIGS. 6A-6C illustrate a method of identifying and using the minimal number R of orthogonal modes to implement a quantum circuit with holographic addressing. The minimal number R of the orthogonal modes and the modes themselves can be identified using singular-value decomposition (SVD) as follows: First, the two-dimensional CGHs $\phi^{(m)}(u)$, which have dimensions of [Q×W], are reshaped into one-dimensional column vectors $L^{(m)}$ whose sizes are each [QW×1] as shown in FIG. 6A. The CGH set $\{\phi^{(m)}(u)\}$ corresponds to the set of column vectors $\{L^{(m)}\}$. Second, a matrix $\mathcal{M}$ with a size of [QW×$\mathcal{D}$] is constructed by taking each column vectors of $\{L^{(m)}\}$ as the matrix's columns, as illustrated at upper left in FIG. 6B. Third, performing a singular-value decomposition on the matrix $\mathcal{M}$ gives $\mathcal{M} = U\Sigma V^+$, where U and V are unitary matrices and X is a diagonal matrix. The minimal number R of orthogonal modes is given by the number of non-zero entries of the diagonal matrix $\Sigma$ (i.e., the rank of the matrix $\mathcal{M}$). The resulting set of orthogonal modes are the first R column vectors, $U_1, U_2, \ldots U_R$, of the unitary matrix U, as shown in the FIG. 6B. FIG. 6C illustrates how to coherently mix the $U_1, U_2, \ldots U_R$, to implement the target n-th layer $L^{(n)}$, which corresponds to the spatial-mode distribution $\mathcal{E}^{(n)}(r)$ at the atomic qubit plane.

Systems for Holographic Addressing of Atomic Qubits

FIG. 7 illustrates a system 700 that holographically implements a quantum circuit. The system 700 includes a coherent light source 702 that emits a coherent electric field (e.g., a laser beam) that manipulate the atomic qubit states. An optical modulator 710 modulates the laser beam to globally define the unit pulse duration for addressing each hologram. The optical modulator 710 can also adaptively shape the pulse to increase or maximize gate fidelity. This unit pulse duration, which can be about 50 ns to about 10 µs, sets the duration of each layer in the quantum circuit. Together, the coherent light source 702 and optical modulator 710 form a coherent light source that emits pulses of laser light. The coherent light source 702 and optical modulator 710 can also be replaced by a pulsed laser that emits pulses of laser light.

An optical beam director 720 coupled to the output of the optical modulator 710 routes the modulated laser beam (the pulses of laser light) to a discrete set of orthogonal spatial modes, each of which corresponds to a different angle (or, equivalently, a different position). These spatial modes illuminate an SLM 730, which may be a static phase or amplitude mask, dynamic liquid crystal or MEMS-mirror device, or spinning disk with a patterned surface, that spatially modulates the phase and/or amplitude of the incident wave front. The SLM 730 displays CGHs encoding the layers of the quantum circuit or quantum operations to be performed by the atomic qubits. Illuminating the SLM 730 at different angles (or, equivalently, illuminating different areas of the SLM) produces coherent spatial-mode distributions that encode respective layers of the quantum circuits or respective (sets of) quantum operations to be performed by atomic qubits. The spatial-mode distributions are then imaged to the atomic qubit array 740.

Optics 704, including lenses, mirrors, beam splitters, and/or wave plates, route the laser beam among the components. A processor 750 and control and timing system 760 control the optical modulator 710, optical beam director 720, and SLM 730. The processor 750 actuates the SLM 730 to display different subsets of the CGHs over different time periods, each of which corresponds to at least one layer of the quantum circuit. The control and timing system 760 synchronizes the temporal modulation of the laser beam by the optical modulator 710 with changes in the CGHs displayed by the SLM 730. It also actuates the optical beam director 720 to illuminate the different CGHs displayed by the SLM 730.

With holographic addressing, the switching speed of the optical beam director 720 determines the characteristic operating frequency for implementing the quantum circuit, given enough laser power to produce a strong enough spatial mode diffracted by the encoded hologram on the SLM 730. The total amount of laser power depends on the saturation intensity of the atomic qubits being addressed by the spatial-mode distributions. For example, about 1 µW per spatial mode may be sufficient for some configurations given diffraction-limited spatial resolution. For 600 qubit controls with 600 layers and a 10% diffraction efficiency from the SLM 730, this implies a total of 3.6 W power emitted by the coherent light source 702.

The optical beam director 720 can include an electro-optic switch, MEMS-based switch, acousto-optic or electro-optic beam deflector, piezo- or galvo-scanning mirror, or other suitable device that can switch the incident laser beam among the set of orthogonal transverse Fourier modes. An alternative kind of the beam director is a multi-channel optical switch. Another alternative approach is to use an array of free-space or fiber-coupled electro-optic (EO)

modulators or an array of free-space or fiber-coupled acousto-optic (AO) modulators in the Fourier (or equivalently image) plane of the SLMs, so that individual beams of the array illuminate the entire SLM 730 at different angles (or equivalently small patches of the SLM 730). Another alternative is to replace the coherent light source 702 and optical beam director 720 with an array of coherent light sources (e.g., a VCSEL array) with one laser per spatial mode/CGH, where each laser is actuated to produce a corresponding spatial-mode distribution. Another approach to implementing the optical beam director 720 is to use a spinning disk with phase or amplitude gratings fabricated lithographically on the disk surface. For a spinning speed of 5000 rpm (typical for an optical disk drive), a sub-100 ns deflection speed is possible. It is also possible to concatenate acousto-optic modulators, electro-optic modulators, spinning disks, and/or other components for routing laser beams at different wavelengths to the SLM 730. For example, an appropriately patterned spinning disk could replace both the optical beam director 720 and the SLM 730 for addressing a 1-dimensional qubit array.

The number of CGHs that can be displayed on the SLM 730 depends on the number of qubits in the atomic qubit array. From a different perspective, the number of unique beams that the SLM 730 can create is of the same order of the number of pixels in the SLM 730 (typically about N/4, where N is the number of SLM pixels). Thus, to control P qubits, the SLM 730 should be capable of implementing about N/4P CGHs that represent quantum circuit layers. An ideal SLM 730 with an array of 1280 pixels by 1024 pixels can control 600 qubits with 600 layers (or 600 CGHs), which correspond to a quantum volume of $2^{600}$ for ideal qubits.

The wavelength or frequency of each pulse of light from the coherent light source 702 can be resonant with the atomic transition of the atomic qubit(s) 740 addressed by the system 700. This resonance condition can also be achieved with a multi-photon transition—e.g., by illuminating an atomic qubit 740 with two laser pulses whose frequency sum or difference is resonant with the desired transition of the atomic qubit 740. These pulses can be generated by different lasers of the coherent light source, by modulating or nonlinearly frequency-shifting the output from a single laser, or by modulating each output channel of the optical beam director 720 (e.g., modulating each output channels of an optical switch with the same or different frequencies).

Either or both of the pulses can be spatially modulated by diffraction off the holographically encoded mode distributions displayed by the SLM to implement a logic gate. If the frequency difference between the pulses is small enough (e.g., close enough to be Bragg-matched to the same acoustic grating in an acousto-optic deflector) and are directed with an optical beam deflector, they can be steered with the same optical beam director to the same hologram, which diffracts both of them in the same direction. If the frequency difference between pulses is larger, then the optical beam director may steer them to different transverse modes, which illuminate different holograms. If those frequency components are produced within the same optical channel of the optical switch (e.g., by modulating the switch with RF frequencies), they have the same transverse mode that excites the same hologram. The holograms diffract the pulses at angles (or positions, equivalently) selected so that the spatially modulated pulses address the desired atomic qubits 740.

The laser wavelength can also be tuned during operation, e.g., to address different atomic transitions or different holograms or for slight angular tuning of the diffracted beam. This wavelength tuning can be accomplished by modulating the laser directly with thermal tuning or with an external modulator, such as an electro-optic modulator or acousto-optic modulator between the laser and the SLM. In these cases, the SLM can be programmed with holograms configured to diffract beams at different wavelengths for implementing different types of logic gates.

Fourier-Domain Systems for Holographic Addressing of Atomic Qubits

FIGS. 8A and 8B illustrate a system 800 configured to implement a quantum circuit holographically encoded in the optical Fourier domain. This system 800 uses an SLM 830 to display a holographic representation $\Psi$ of the quantum circuit as angle-multiplexed CGHs. A fast optical switch 820 addresses transverse Fourier modes $k_T^{(m)}$ at kilohertz or megahertz rates. Each mode activates a single target CGH $\phi^{(m)}(u)$, which corresponds to the target spatial-mode distribution $\mathcal{E}^{(m)}(r)$ for initializing, manipulating, and/or measuring hundreds to thousands of atomic qubits 840 arrayed in 2D or 3D.

The system 800 includes a laser 802 that generates a continuous-wave (cw) beam at a wavelength near or far from resonance of the atomic qubits 840. The laser beam propagates through an acousto-optical modulator (AOM) 810, which acts as a pulse carver that defines the unit duration (e.g., 50 ns to 10 µs) of each layer of the quantum circuit. Alternatively, the cw laser 802 and AOM 810 can be replaced by a pulsed laser that emits pulses, each of which has a duration equal to the unit duration of each layer of the quantum circuit. The laser 802 and AOM 810 can be coupled via fiber optics and/or free-space optics, such as mirrors, lenses, and other optical elements.

The modulated laser beam propagates to an optical switch 820 via free space and/or fiber optics. The optical switch 820 switches the laser beam's transverse spatial mode through a set of predetermined spatial modes (angles) at rates of up to hundreds of kilohertz or megahertz. The optical switch 820 is synchronized to the AOM 810 (or alternatively to a pulsed laser) so that each laser pulse illuminates a different hologram displayed by the SLM 830. Once the optical switch 820 has illuminated all of the holograms displayed by the SLM 830, the SLM 830 can be actuated to show a different set of holograms. In this way, the system 800 can generate a virtually unlimited number of layers of a quantum circuit.

Free-space optics, such as a lens 822, relay the switched laser beam to the SLM 830, which is programmed with multiplexed holograms $\Psi$. Illuminating one of the multiplexed holograms $\Psi$ produces a corresponding spatial mode at the atomic qubit array 840. These spatial modes can be chosen ahead of time as described above to initialize, manipulate, and/or measure particular qubit states or can be updated on the fly of qubit-state processing.

Depending on the types of SLM 830, the holograms $\Psi$ can be phase-only holograms, amplitude-only (e.g., binary amplitude modulated) holograms, or phase-and-amplitude holograms. Likewise, the holograms $\Psi$ can be multiplexed angularly, spatially, polytopically, or using any other suitable multiplexing method or combination of multiplexing methods. In this case, the holograms $\Psi$ are multiplexed by angle, as shown in FIG. 8A. Each multiplexed hologram can be represented as the superposition of a CGH $\phi^{(m)}(u)$ and a tilted fringe pattern or transverse Fourier mode $k_T^{(m)}$. Each CGH encodes a particular spatial-mode distribution for illuminating the atomic qubit array 840, and each fringe pattern (transverse Fourier mode) encodes the multiplexing (laser beam deflection) angle (the fringes represent the spatial Fourier transform of the deflection angle, with higher-frequency fringes corresponding to larger deflection angles).

In FIG. 8A, the incident angle at time $t_N$ matches but is phase-conjugated with spatial fringe pattern (transverse Fourier mode) 821a, so the switched laser beam diffracts off the corresponding angle-multiplexed hologram encoded by the SLM 830. At time $t_{N+1}$, the deflection angle matches also but is phase-conjugated with spatial fringe pattern (transverse Fourier mode) 821b, producing a diffraction off a different angle-multiplexed hologram encoded by the SLM 830. The diffracted laser beams are encoded with the corresponding CGHs and focused onto the atomic qubit array 840 by a microscope 838 to produce spatial distributions 841a and 841b in the plane or volume of the atomic qubit array 840 at times $t_N$ and $t_{N+1}$, respectively. A spatial filter 834 in the Fourier plane of a telescope formed by lenses 832 and 836 blocks undesired diffractions off the SLM 830, such as higher-order diffractions and diffractions off other holograms.

As noted above, the SLM 830 has fine spatial resolution but relatively slow; at best, its fastest modulation speed may be on the order of kilohertz. This means that the multiplexed holograms $\Psi$ can be changed at most on the order of 1000 times per second. However, the optical switch 820 can deflect beams very quickly—e.g., at megahertz rates—and the SLM 830 can encode hundreds to thousands of angle-multiplexed holograms $\Psi$ at a given time. By accessing each hologram in the SLM 830 at least once per SLM frame period with the optical switch 820, the system 800 can illuminate the atomic qubit array 840 with hundreds to thousands of spatial modes per SLM frame period. If each spatial mode corresponds to a different qubit operation, this implies at least 100,000 to 1,000,000 qubit operations per second.

During the computation, the SLM 830 can be refreshed periodically or as desired to provide access to the desired fundamental operations. If the number of fundamental operations is small enough, they can be programmed into multiplexed holograms on a static holographic medium, such as a piece of film or polymer, instead of a dynamic SLM 830, and accessed with a deflected laser beam or other suitable readout mechanism.

As explained above, each hologram produces a corresponding spatial-mode distribution. Each distribution can be mapped to a particular moment in time by choosing the beam incident angle at that moment in time to match the angle encoding for the corresponding hologram. Different spatial modes map onto different operations (e.g., $\pi$ pulses, $\pi/2$ pulses, etc.) for different atomic qubits 840. These operations may be fundamental or "atomic" operations that can be ordered and re-ordered to perform more complicated calculations or simulations.

FIG. 8B illustrates how to produce coherent superpositions of spatial-mode distributions encoded in the multiplexed holograms $\Psi$ displayed by the SLM 830. In FIG. 8B, the optical switch 820 illuminates two holograms at time $t_{N+3}$ with a beam 821' to produce a coherent superposition 841' of two spatial-mode distributions and hence perform two sets operations on the atomic qubits 840 simultaneously. More generally, each hologram can encode the unit blocks of one or more quantum "sub-circuits" (e.g., arrays of single qubit unitary operations and two-qubit gates), making it possible to build a target quantum circuit by coherently superposing the unit blocks by illuminating more than one hologram at a time. These holograms can be found using SVD as described above with respect to FIGS. 6A and 6B.

FIG. 9 illustrates another system 900 configured to implement the Fourier-domain holographic representation of a quantum circuit using an optical beam deflector 920 instead of an optical switch 820 (FIGS. 8A and 8B) as the optical beam director. The system 900 includes a laser 902 that emits a laser beam for pulse carving by an AOM 910. The AOM 910 transmits the laser beam to the optical beam deflector 920, which may be an acousto-optic deflector, galvo-scanning mirror, or other suitable device. If the optical beam deflector 920 is an acousto-optic deflector, the AOM 910 can be used in a double-pass geometry to compensate for any Doppler frequency shift in the acousto-optic deflector 920. Unless compensated, this Doppler frequency shift may tune the laser beam frequency away from the target operation frequency. The laser 902 and AOM 910 can be replaced by a pulsed laser whose output pulses are synchronized to the optical beam deflector 920.

The optical deflector 920 steers, steps, or switches the laser beam through a set of predetermined angles, each of which is selected to produce a different diffraction from a corresponding CGH displayed by an SLM 930. The diffracted laser beams are spatially filtered with an aperture 934 between lenses 932 and 936 and focused onto a 2D or 3D atomic qubit array 840. In this example, the deflection angles at times $t_N$ and $t_{N+1}$ match spatial fringe patterns (transverse Fourier mode) 921a and 921b, respectively, and illuminate the atomic qubit array 840 with spatial distributions 941a and 941b, respectively.

Real-Space-Domain Holographic Addressing of Atomic Qubits

FIG. 10 illustrates a system 1000 that implements the holographic representation of a quantum circuit in real-space domain, which is equivalent to the Fourier-domain representation $\Psi$. The system 1000 includes a laser 1002 whose vertically polarized output is amplitude-modulated with an AOM 1010. A polarizing beam splitter (PBS) 1012 reflects the amplitude-modulated, vertically polarized laser beam to an optical beam deflector 1020, such as an acousto-optic deflector or galvo- or piezo-scanning mirror, that directs the laser beam through a lens 1022, which transforms the deflection angle into a proportional transverse spatial offset. A quarter-wave plate 1024 in series with the lens 1022 changes the laser beam's polarization state from vertically polarized to left-hand (right-hand) circularly polarized.

The circularly polarized laser illuminates an amplitude SLM 1030 in the focal plane of the lens 1022. The amplitude SLM 1030 displays patched spatial-mode distributions $\{\widetilde{\mathcal{E}}^{(m)}(r)\}$ like those in FIGS. 3 and 4A. These patched spatial-mode distributions are (potentially magnified) real-space versions, rather than Fourier-domain representations, of the spatial-mode distributions that illuminate a qubit array 1040 for implementing the quantum circuit. In this case, the optical beam deflector 1020 deflects the incoming beam to the transverse Fourier mode of $K_T^{(m')}$, which locally illuminates the target patch $\widetilde{\mathcal{E}}^{(m')}(r)$ shown by the SLM 1030. The SLM 1030 reflects an amplitude-modulated image of the target patch in a right-hand (left-hand) circular polarization state, which the quarter-wave plate 1024 transforms to a horizontal polarization state. The horizontally polarized light propagates back through the lens 1022 and optical beam deflector 1020 to the PBS 1012, which transmits it to lenses 1032 and microscope 1034 to a 2D or 3D atomic qubit array 1040.

FIG. 10 also shows how the deflection angles imparted by the optical beam deflector 1020 map to different spatial-mode distributions as a function of time. As in the Fourier-domain system 900 shown in FIG. 9, the optical beam deflector 1020 deflects the laser beam to different angles at times $t_N$ and $t_{N+1}$. At time $t_N$, the beam deflection angle maps to spatial patch 1031a and produces spatial-mode distribution 1041a that performs a first operation on the atomic qubit array 1040. Similarly, at time $t_{N+1}$, the beam deflection angle maps to spatial patch 1031b and produces spatial-mode distribution 1041b that performs a second operation on the atomic qubit array 1040. If desired, the optical beam deflector 1020 can illuminate more than one spatial patch at a time to produce a coherent superposition of spatial-mode distributions for operating on the atomic qubit array 1040.

FIG. 11 illustrates a system 1110 that implements the holographic representation of a quantum circuit in the real-space domain with a phase SLM 1130 instead of an amplitude SLM. A laser 1102 emits a vertically polarized laser beam that is amplitude-modulated into pulses by an AOM 1110. A PBS 1112 reflects the pulsed, vertically polarized laser beam to an optical beam deflector 1120 that deflects the beam to different angles at different times in order to illuminate different patches shown by the SLM 1130 (e.g., patches 1131a and 1131b at times $t_N$ and $t_{N+1}$, respectively). The deflected beam propagates through a half-wave plate 1124, which transforms the beam's polarization state from vertically polarized to 45° polarized, and to the SLM 1130.

The SLM 1130 reflects a wave front whose phase is spatially modulated according to the pattern of the illuminated patch. The half-wave plate 1124 transforms the modulated portion reflected wave front's polarization state from 45° polarized to horizontally polarized. The horizontally polarized light passes through the PBS 1112, through lenses 1132 and a microscope 1134, and on to the atomic qubit array 1140, where the resulting spatial-mode distributions (e.g., distributions 1141a and 1141b at times $t_N$ and $t_{N+1}$, respectively) operate on the qubits. At the same time, the SLM 1130 reflects the unmodulated portion of the beam without transforming its polarization state. As a result, the unmodulated reflected wave front remains vertically polarized as it passes back through the half-wave plate 1124. The PBS 1112 reflects this vertically polarized away from the atomic qubit array 1140, effectively producing amplitude modulation at the atomic qubit array 1140.

FIG. 12 illustrates a system 1200 that uses an array of discrete SLMs 1230 to display a holographic representation of a quantum circuit in the real-space domain. Using several SLMs 1230 to display the patches, e.g., with one patch per SLM, increases the number of pixels and hence the hologram's spatial resolution, number of patches, or both. It also makes it possible to increase the system's duty cycle, possibly to 100%, by addressing one or more SLMs 1230 while refreshing or reprogramming the SLMs 1230 that are not are being addressed.

A laser 1202 emits a vertically polarized laser beam that is amplitude-modulated into pulses by an AOM 1210. A PBS 1212 reflects the pulsed, vertically polarized laser beam to an optical beam deflector 1220 that deflects the beam to different angles at different times in order to illuminate different SLMs 1230 or different portions of the different SLMs 1230, which can modulate phase or amplitude. The deflected beam propagates through a wave plate 1124, which transforms the beam's polarization state, and to one or more of the SLM 1230s. The illuminated SLMs 1230 reflect amplitude- or phase-modulated beams to the wave plate 1224, which transforms the reflected wave front's polarization state for transmission through the PBS 1212. The beams pass through lenses 1232 and a microscope 1234 and on to the atomic qubit array 1240, where the resulting spatial-mode distributions operate on the qubits.

Those of skill in the art will readily recognize that there are many variations and extended forms of this holographic method. For example, the systems shown in FIGS. 7-12 can be implemented with other components, including different arrangements of lenses, beam splitters, spatial filters, wave plates, mirrors, and/or other passive components. Likewise, the optical beam deflector can be implemented as an optical switch (e.g., a MEMS-based switch), beam deflector, or other suitable device. There are many suitable types of SLMs, include dynamic liquid crystal and MEMS-mirror devices, static phase masks, static amplitude masks, and spinning disks whose surfaces are patterned to produce the desired phase or amplitude modulation. And the holograms display by the SLM can be encoded in the real-space or Fourier domain and multiplexed in angle, space, etc. Each system's components can be coupled to each other via free space or waveguides, including optical fibers. Depending on details of quantum circuits to be implemented, a given variation could have practical benefits over other variations.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of" or "exactly one of." "Consisting essentially of" when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein in the specification and in the claims, when a numerical range is expressed in terms of two values connected by the word "between," it should be understood that the range includes the two values as part of the range.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of addressing an array of atomic quantum bits (qubits), the method comprising:
    illuminating a first multiplexed hologram in an array of multiplexed holograms with a laser beam, the laser beam diffracting off the first multiplexed hologram to produce a first spatial-mode distribution representing a first layer in a quantum circuit to be executed by the array of atomic qubits; and
    illuminating the array of atomic qubits with the first spatial-mode distribution, the first spatial-mode distribution at least one of initializing, manipulating, or measuring a first state of the array of atomic qubits.

2. The method of claim 1, further comprising:
    illuminating a second multiplexed hologram in the array of multiplexed holograms with the laser beam, the laser beam diffracting off the second multiplexed hologram to produce a second spatial-mode distribution representing a second layer in the quantum circuit; and
    illuminating the array of atomic qubits with the second spatial-mode distribution, the second spatial-mode distribution at least one of initializing, manipulating, or measuring a second state of the array of atomic qubits.

3. The method of claim 2, wherein illuminating the first multiplexed hologram occurs before illuminating the second multiplexed hologram.

4. The method of claim 2, wherein illuminating the first multiplexed hologram and illuminating the second multiplexed hologram occur simultaneously.

5. The method of claim 2, wherein illuminating the first multiplexed hologram comprises directing the laser beam onto a spatial light modulator at a first angle and illuminating the second multiplexed hologram comprises directing the laser beam onto the spatial light modulator at a second angle different than the first angle.

6. The method of claim 2, further comprising:
    switching between illuminating the first multiplexed hologram and illuminating the second multiplexed hologram in less than 1 microsecond.

7. The method of claim 6, wherein the array of multiplexed holograms is a first array of multiplexed holograms, and further comprising:
    displaying the first array of multiplexed holograms in a spatial light modulator; and
    actuating the spatial light modulator to display a second array of multiplexed holograms at a frame rate of less than 1 kHz.

8. The method of claim 2, wherein the laser beam is a first laser beam at a first frequency, and further comprising:
    illuminating the array of atomic qubits with a second laser beam at a second frequency different than the first frequency while illuminating the array of atomic qubits with the first spatial-mode distribution.

9. The method of claim 1, wherein the laser beam is a first laser beam, and further comprising:
    illuminating the first multiplexed hologram with a second laser beam to produce a second spatial-mode distribution; and
    illuminating the array of atomic qubits with the second spatial-mode distribution.

10. A quantum processor comprising:
a coherent light source to emit a coherent optical beam;
a spatial light modulator (SLM) to display holograms encoding respective spatial-mode distributions, the spatial-mode distributions representing respective quantum operations;
an optical beam director, in optical communication with the light source and the SLM, to illuminate the holograms with the coherent optical beam, thereby producing the respective spatial-mode distributions; and
an array of atomic qubits, in optical communication with the SLM, to carry out the quantum operations in response to being illuminated by the respective spatial-mode distributions.

11. The quantum processor of claim 10, wherein the coherent light source is configured to emit the coherent optical beam as a pulsed coherent optical beam and the optical beam director is configured to illuminate different holograms with different pulses of the pulsed coherent optical beam to produce a sequence of the spatial-mode distributions representing layers of a quantum circuit.

12. The quantum processor of claim 10, wherein the SLM comprises at least one of a liquid-crystal SLM, a static phase mask, a static amplitude mask, or a patterned spinning disk.

13. The quantum processor of claim 10, wherein the holograms are angularly multiplexed Fourier-domain representations of the respective spatial-mode distributions.

14. The quantum processor of claim 10, wherein the holograms are spatially multiplexed real-space-domain representations of the respective spatial-mode distributions.

15. The quantum processor of claim 10, wherein each spatial-mode distribution encodes a corresponding layer of a quantum circuit.

16. The quantum processor of claim 10, wherein the optical beam director is configured to illuminate different holograms with different portions of the coherent optical beam simultaneously to illuminate the array of atomic qubits with a superposition of the spatial-mode distributions.

17. The quantum processor of claim 10, wherein the optical beam director comprises at least one of an optical multi-channel switch, an optical modulator array, an optical beam deflector, or a series of free-space optics and optical modulators configured to switch the coherent optical beam among spatial modes in a discrete set of spatial modes.

18. The quantum processor of claim 10, wherein the optical beam director is configured to switch the laser beam among the holograms at a rate faster than a frame rate of the SLM.

19. The quantum processor of claim 10, wherein the optical beam director is configured to illuminate multiple holograms simultaneously so as to illuminate the array of atomic qubits with a coherent superposition of the respective spatial-mode distributions.

20. The quantum processor of claim 10, where the array of atomic qubits is a three-dimensional array of atomic qubits.

21. A quantum processor comprising:
a coherent light source to emit a coherent optical beam;
a phase-only spatial light modulator (SLM) to display sets of holograms encoding Fourier-domain representations of respective spatial-mode distributions, the spatial-mode distributions representing respective quantum operations, the SLM being configured between sets of holograms at rate of up to 1 kHz;
an optical beam director, in optical communication with the light source and the SLM, to illuminate the sets of holograms with the coherent optical beam, thereby producing the respective spatial-mode distributions, the optical beam director being configured to switch the coherent optical beam between holograms in the sets of holograms at rate greater than 1 kHz; and
an array of atomic qubits, in a Fourier plane of the SLM, to carry out the quantum operations in response to being illuminated by the respective spatial-mode distributions.

* * * * *